US012394326B2

(12) United States Patent
Gariel et al.

(10) Patent No.: US 12,394,326 B2
(45) Date of Patent: Aug. 19, 2025

(54) DETECTING AND AVOIDING CONFLICTS BETWEEN AIRCRAFT

(71) Applicant: Joby Aero, Inc., Santa Cruz, CA (US)

(72) Inventors: Maxime Marie Christophe Gariel, San Francisco, CA (US); Marc Francois Xavier Piette, Orinda, CA (US); Evan Michael Wilson, San Francisco, CA (US); Anne-Claire Le Bihan, San Mateo, CA (US); Marc Alain Lecerf, San Mateo, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 172 days.

(21) Appl. No.: 17/307,444

(22) Filed: May 4, 2021

(65) Prior Publication Data

US 2021/0350716 A1 Nov. 11, 2021

Related U.S. Application Data

(60) Provisional application No. 63/020,937, filed on May 6, 2020.

(51) Int. Cl.
*G08G 5/80* (2025.01)
*G08G 5/21* (2025.01)
(Continued)

(52) U.S. Cl.
CPC ................. *G08G 5/80* (2025.01); *G08G 5/21* (2025.01); *G08G 5/55* (2025.01); *G08G 5/56* (2025.01); *G08G 5/59* (2025.01)

(58) Field of Classification Search
CPC .... G08G 5/045; G08G 5/0021; G08G 5/0043; G08G 5/006
See application file for complete search history.

(56) References Cited

U.S. PATENT DOCUMENTS 8,897,935 B2 * 11/2014 Meunier .............. G05D 1/0676 340/948
10,302,759 B1 * 5/2019 Arteaga ............... G08G 5/0082
(Continued)

OTHER PUBLICATIONS

"Airborne Collision Avoidance System", Wikipedia page. https://web.archive.org/web/20200429222910/https://en.wikipedia.org/wiki/Airborne_collision_avoidance_system, Dated Apr. 29, 2020.
(Continued)

*Primary Examiner* — Donald J Wallace
(74) *Attorney, Agent, or Firm* — DORITY & MANNING, P.A.

(57) ABSTRACT

An aircraft includes a display and an avoidance system. The avoidance system is configured to determine a first predicted trajectory of the aircraft, determine a second predicted trajectory of an additional aircraft, and determine a conflict zone volume based on an intersection between the first predicted trajectory and the second predicted trajectory. The conflict zone volume indicates a predicted volume of airspace in which the aircraft and the additional aircraft experience a loss of separation. The avoidance system is configured to render a conflict zone on the display based on the conflict zone volume. The rendered conflict zone graphically represents the conflict zone volume on the display.

38 Claims, 21 Drawing Sheets

(51) Int. Cl.

| | |
|---|---|
| ***G08G 5/55*** | (2025.01) |
| ***G08G 5/56*** | (2025.01) |
| ***G08G 5/59*** | (2025.01) |

(56) References Cited

U.S. PATENT DOCUMENTS

| | | | | |
|---|---|---|---|---|
| 2003/0222795 | A1* | 12/2003 | Holforty | B64D 43/00 340/968 |
| 2009/0125221 | A1* | 5/2009 | Estkowski | G08G 5/045 701/120 |
| 2009/0259402 | A1* | 10/2009 | Gates | G08G 5/0078 701/301 |
| 2012/0194556 | A1* | 8/2012 | Schmitt | G08G 5/0078 345/650 |
| 2019/0012925 | A1* | 1/2019 | Barker | G08G 5/0013 |
| 2019/0381977 | A1* | 12/2019 | Kanagarajan | B60T 7/18 |
| 2020/0410879 | A1* | 12/2020 | Reinquin | G08G 3/02 |
| 2021/0043098 | A1* | 2/2021 | Wang | G08G 5/21 |

OTHER PUBLICATIONS

"Minimum Operational Performance Standards (MOPS) for Detect and Avoid (DAA) Systems", This document was prepared by Special Committee 228 (SC-228) and approved by the RTCAProgram Management Committee (PMC) on May 31, 2017. 389 pages.

"Standard Specification for Detect and Avoid System Performance Requirements", ASTM International, 22 pages. Current edition approved May 1, 2020. Published May 2020. DOI: 10.1520/F3442-20.

* cited by examiner

DETECTING AND AVOIDING CONFLICTS BETWEEN AIRCRAFT

CROSS-REFERENCE TO RELATED APPLICATION

This application claims the benefit of U.S. Provisional Application No. 63/020,937, filed on May 6, 2020. The disclosure of the above application is incorporated herein by reference in its entirety.

FIELD

The present disclosure relates to aircraft conflict avoidance.

BACKGROUND

Aircraft separation may refer to the concept of keeping two aircraft at least a minimum distance from one another. Maintaining a minimum separation distance may reduce the risk of aircraft collisions and prevent incidents due to other factors (e.g., wake turbulence). Minimum separation may also be applied to other objects and terrain. A conflict between two aircraft may refer to an event in which the two aircraft experience a loss of minimum separation. In some implementations, air traffic controllers may monitor the location of aircraft in their airspace and enforce traffic separation rules to prevent conflicts.

SUMMARY

In one example, the present disclosure is directed to an aircraft comprising a display and an avoidance system. The avoidance system is configured to determine a first predicted trajectory of the aircraft, determine a second predicted trajectory of an additional aircraft, and determine a conflict zone volume based on an intersection between the first predicted trajectory and the second predicted trajectory, wherein the conflict zone volume indicates a predicted volume of airspace in which the aircraft and the additional aircraft experience a loss of separation. The avoidance system is configured to render a conflict zone on the display based on the conflict zone volume, wherein the rendered conflict zone graphically represents the conflict zone volume on the display.

In one example, the present disclosure is directed to non-transitory computer-readable medium comprising computer-executable instructions. The computer-executable instructions cause a processing unit to determine a first predicted trajectory of a first aircraft, determine a second predicted trajectory of a second aircraft, and determine a conflict zone volume based on an intersection between the first predicted trajectory and the second predicted trajectory, wherein the conflict zone volume indicates a predicted volume of airspace in which the first aircraft and the second aircraft experience a loss of separation. The instructions cause the processing unit to render a conflict zone on a pilot display based on the conflict zone volume, wherein the rendered conflict zone graphically represents the conflict zone volume on the pilot display.

In one example, the present disclosure is directed to an aircraft operations center comprising an avoidance system. The avoidance system is configured to determine a first predicted trajectory of a first aircraft, determine a second predicted trajectory of a second aircraft, and determine a conflict zone volume based on an intersection between the first predicted trajectory and the second predicted trajectory, wherein the conflict zone volume indicates a predicted volume of airspace in which the first aircraft and the second aircraft experience a loss of separation. The avoidance system is further configured to render a conflict zone on a pilot display based on the conflict zone volume, wherein the rendered conflict zone graphically represents the conflict zone volume on the pilot display.

In one example, the present disclosure is directed to a method comprising determining a first predicted trajectory of a first aircraft, determining a second predicted trajectory of a second aircraft, and determining a conflict zone volume based on an intersection between the first predicted trajectory and the second predicted trajectory, wherein the conflict zone volume indicates a predicted volume of airspace in which the first aircraft and the second aircraft experience a loss of separation. The method further comprises rendering a rendered conflict zone on a pilot display based on the conflict zone volume, wherein the rendered conflict zone graphically represents the conflict zone volume on the pilot display.

In one example, the present disclosure is directed to a method comprising detecting a loss of separation between a first aircraft and a second aircraft, rendering a graphical user interface (GUI) on a pilot display of the first aircraft indicating that the first aircraft is experiencing a loss of separation with the second aircraft, and determining a resolution maneuver for the first aircraft, wherein the resolution maneuver is configured to regain separation between the first aircraft and the second aircraft. The method further comprises rendering a maneuver indicator on the pilot display based on the resolution maneuver, wherein the maneuver indicator graphically indicates the determined resolution maneuver for a pilot to execute in order to regain separation between the first aircraft and the second aircraft. The method further comprises receiving pilot input that controls the first aircraft according to the maneuver indicator, determining when the loss of separation is resolved, and modifying the rendering of the GUI to indicate that the first aircraft is not experiencing a loss of separation.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
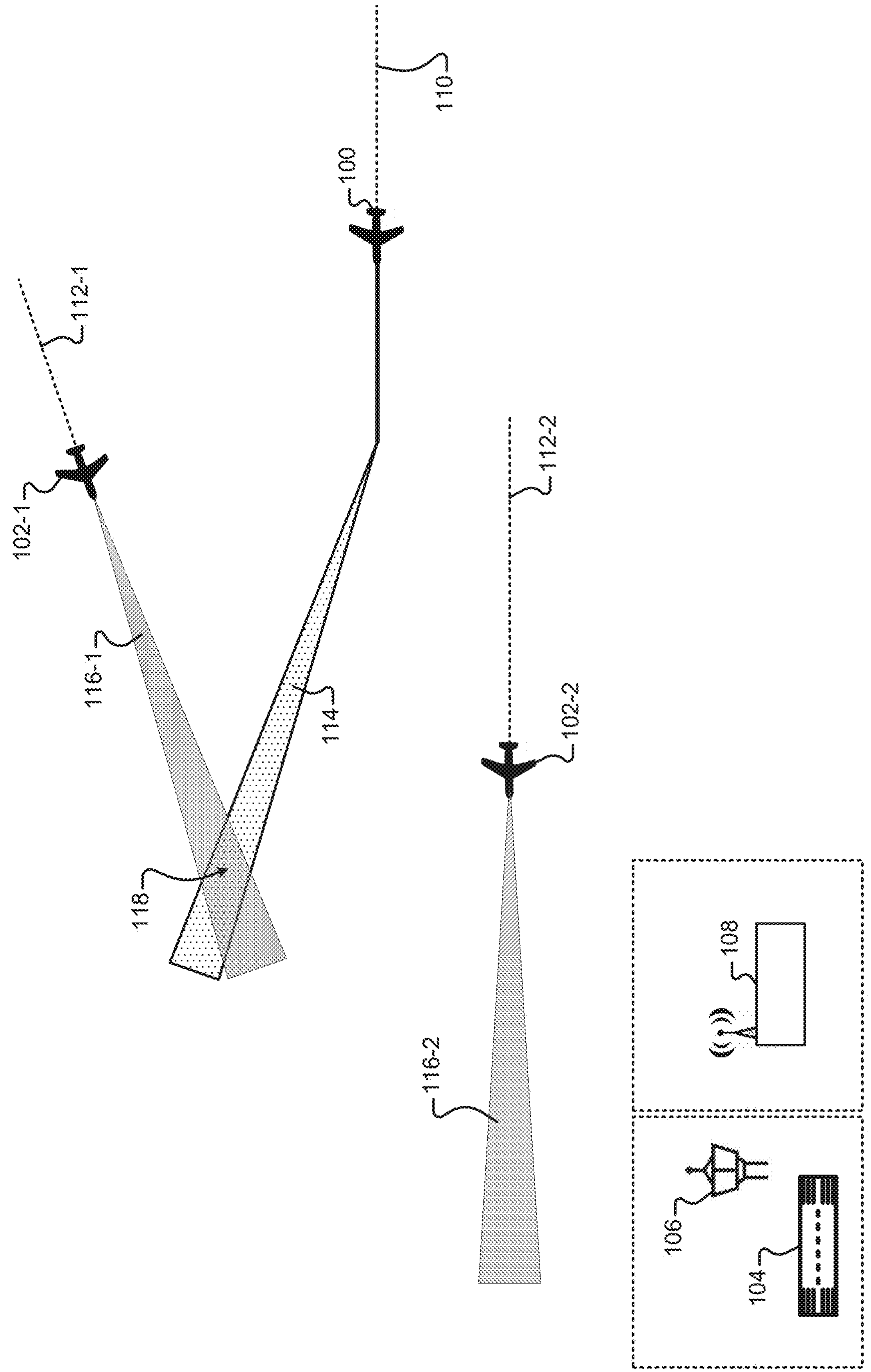
FIG. 1 illustrates an example environment that includes a plurality of aircraft, a runway, an air traffic control facility, and an aircraft operations center.

FIG. 1 illustrates an example environment that includes a plurality of aircraft 100, 102, a runway 104, an air traffic control (ATC) facility 106 (e.g., an ATC tower), and an aircraft operations center 108 (AOC). The plurality of aircraft include an ownship aircraft 100 and other aircraft 102-1, 102-2. The ownship 100 may implement a conflict avoidance system 200 (hereinafter "avoidance system 200") that assists the pilot in identifying and avoiding the other aircraft 102-1, 102-2. For example, the avoidance system 200 may render an avoidance graphical user interface (GUI) on an ownship display that the pilot may use to avoid conflicts with the other aircraft 102-1, 102-2. The ownship 100 and/or AOC 108 may implement the avoidance system 200 in a variety of different ways. Different implementations of the avoidance system 200 are illustrated herein (e.g., see FIGS. 2A, 2F, and 2G). The different implementations of the avoidance system are numbered as 200-1, 200-2, and 200-3. The different implementations of the avoidance system may be generally referred to herein as avoidance system 200.

The avoidance system 200 may predict and detect conflicts between aircraft. In some cases, a conflict may be referred to as a "loss of separation." The avoidance system 200 may also provide a pilot with actionable visual/audio information in response to prediction/detection of the conflicts. For example, the avoidance GUIs may display actionable information to the pilot that helps the pilot avoid potential conflicts. The avoidance GUIs may also display actionable information that helps the pilot resolve a realized conflict (e.g., a current loss of separation).

The avoidance system 200 may predict the trajectory of the ownship 100 and other aircraft 102-1, 102-2. The avoidance system 200 may determine whether the other aircraft will conflict with the ownship based on the predicted trajectories. A conflict between the ownship and another aircraft may refer to a scenario where the ownship and the other aircraft come within less than a threshold distance from one another (e.g., violate a minimum safe distance). Although a collision may occur between two aircraft during a loss of separation, a conflict does not necessarily imply a scenario where there will be a collision between aircraft.

The avoidance system 200 may predict whether there may be a future conflict with other aircraft, such as a future loss of separation due to a flight modification by the ownship and/or the other aircraft. The avoidance system 200 may also determine whether there is a realized conflict with other aircraft. Other aircraft that currently conflict with the ownship and/or may potentially conflict with the ownship within a period of time may be referred to herein as "intruder aircraft" or "intruders."

The avoidance system 200 may determine one or more conflict zones in the airspace based on the ownship predicted/planned trajectory and the predicted trajectories of one or more intruders. The conflict zone may refer to a portion of airspace in which a conflict is occurring, or may occur, between the ownship and one or more intruders. For example, the conflict zone may refer to a volume (e.g., a conflict volume) of airspace in which loss of separation is occurring, or may occur, between the ownship and one or more intruders. Although the conflict zone may define a volume of airspace, in some cases, a conflict zone may refer to one or more areas or other geometries.

The avoidance system 200 may include an avoidance interface for the pilot. The avoidance interface may include an avoidance GUI in some implementations. Additionally, or alternatively, the avoidance pilot interface may include other interface components described herein (e.g., pilot input/output components). The avoidance interface components may be dedicated to avoidance features described herein and/or provide additional functionality for monitoring/controlling the ownship.

The avoidance system (e.g., avoidance interface) may render an avoidance GUI that includes avoidance GUI elements (e.g., graphics/text) that the pilot may use to avoid and resolve conflicts with intruders. Example avoidance GUI elements described herein may include, but are not limited to, a rendered conflict zone 300 (e.g., see FIGS. 3A-3J) and a rendered resolution maneuver indicator 600 (e.g., see FIGS. 6A-6G). The avoidance GUI elements described herein may be included in other aircraft GUIs and/or included on displays that are dedicated to conflict avoidance.

The avoidance system 200 may notify the pilot of a potential conflict using one or more avoidance GUI elements. For example, FIGS. 3A-3E illustrate an example rendered conflict zone 300 that is rendered in a first-person view. A rendered conflict zone may refer to a GUI element that indicates a potential conflict with one or more intruders. FIGS. 5A-5D illustrate avoidance GUIs that include multiple rendered conflict zones in a first-person view. Other example avoidance GUIs may include rendered conflict zones in a top-down view (e.g., see FIG. 3F), a side view (e.g., see FIG. 3G), and a third-person view (e.g., see FIG. 3H).

Figure 4A:
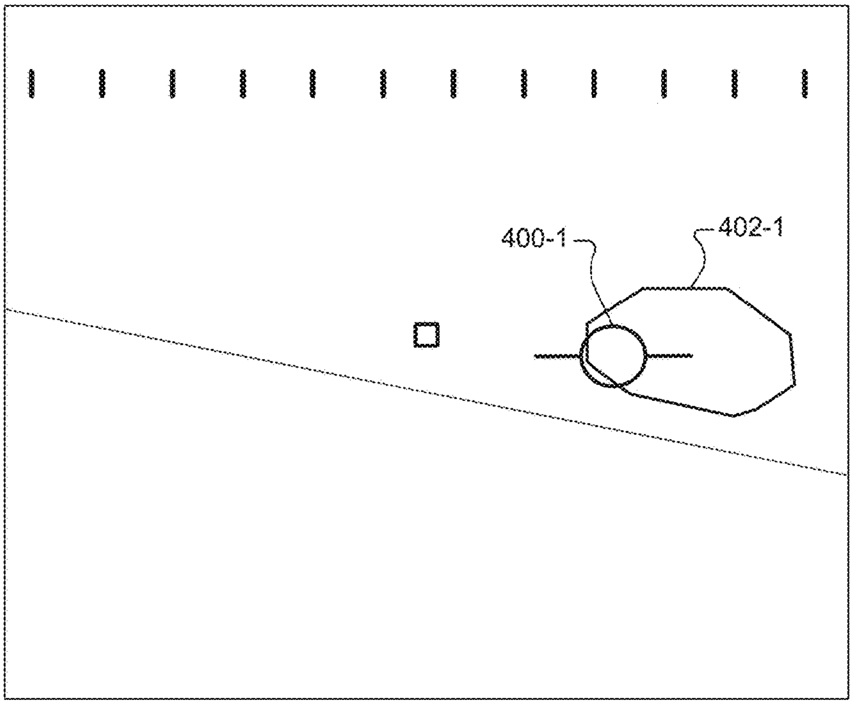
FIGS. 4A-4C illustrate example avoidance GUIs indicating that an aircraft may enter a conflict zone.
Figure 4B:
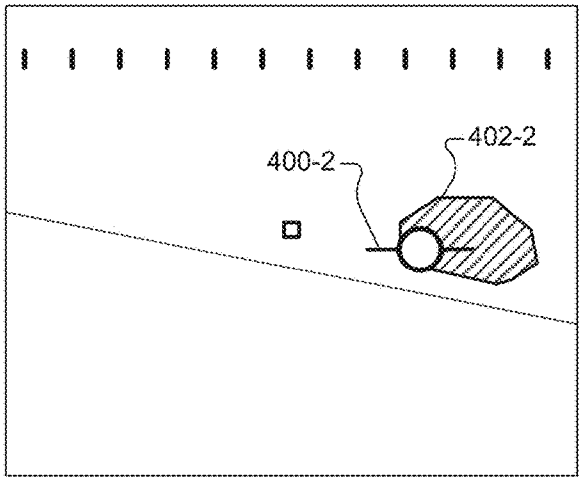
Figure 4C:
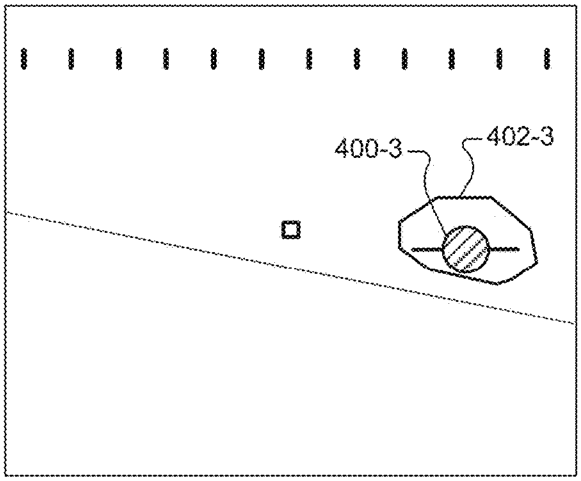

The avoidance system 200 may generate an avoidance GUI that indicates when the ownship is headed into a conflict zone. For example, FIGS. 4A-4C illustrate example GUIs in which overlap of the flight path vector GUI element (e.g., 400) and the rendered conflict zone indicate that the ownship is headed into a conflict zone. Additionally, in FIGS. 4B-4C, the flight path vector and/or rendered conflict zone may be shaded to indicate that the ownship is headed into a conflict zone. The avoidance system 200 may generate a different avoidance GUI in the case of a realized conflict. For example, the avoidance GUI of FIG. 6G illustrates a colored GUI with blinking text that indicates an actual loss of separation.

The avoidance system 200 may generate a resolution maneuver indicator GUI element (hereinafter "maneuver indicator") that indicates a resolution maneuver that the pilot may perform to avoid the conflict zone and/or recover separation. For example, FIGS. 6A-6F illustrate example maneuver indicators 600 that indicate maneuvers the pilot may execute to prevent a conflict. FIG. 6G illustrates an example maneuver indicator that indicates a maneuver the pilot may execute to recover from a current conflict.

In some implementations, the avoidance system 200 may provide other cues to the pilot for identifying and avoiding potential/realized conflicts. The other cues may be in addition to the avoidance GUIs, or as an alternative to the avoidance GUIs. In some examples, the avoidance system 200 may provide avoidance audio, such as voice feedback and/or other sounds (e.g., warning sounds) that indicate potential/realized conflicts and/or avoidance maneuvers. As another example, the avoidance system 200 may provide visual feedback, such as flashing lights that indicate potential/realized conflicts and/or avoidance maneuvers. As another example, the avoidance system 200 may provide tactile/haptic feedback that indicates potential/realized conflicts and/or avoidance maneuvers. For example, the avoidance system 200 may actuate vibration of the pilot controls or other device(s) that the pilot is touching and/or wearing (e.g., a watch).

The avoidance system 200 may operate in a variety of different flight scenarios. For example, the avoidance system

200 may operate at high altitudes where flight paths tend to be straighter and at higher speeds. As another example, the avoidance system 200 may operate during takeoff and landing near airports, where there may be a high density of traffic and greater likelihood of aircraft maneuvering. In some implementations, the avoidance system 200 may be configured to operate in different manners, depending on the flight scenario (e.g., en-route, landing, takeoff, etc.).

The avoidance system 200 may be implemented in a variety of aircraft, such as a fixed-wing aircraft (e.g., an airplane), a rotorcraft (e.g., a helicopter), a vertical takeoff and landing aircraft (VTOL), an electric aircraft, and/or a balloon. In some implementations, the ownship may include a human pilot that controls the ownship. In other implementations, the ownship may be piloted remotely. For example, the avoidance system 200 may be implemented in the AOC 108 (e.g., see FIG. 2G). In this example, a remote pilot may control the ownship from the AOC 108 and view the avoidance GUI elements on one or more displays in the AOC 108. Using the actionable information provided by the avoidance GUIs and other interfaces described herein, a local/remote pilot may safely and easily avoid/resolve conflicts with other aircraft.

Referring to FIG. 1, the ownship 100 and the other aircraft 102 may be associated with a historical trajectory (e.g., 110, 112-1, 112-2) and a predicted trajectory (e.g., 114, 116-1, 116-2). A trajectory may refer to a sequence of positions of an aircraft over time. The historical trajectory may refer to a sequence of positions, or estimated positions, prior to the present time. The predicted trajectory may refer to a predicted sequence of positions at future times. Each of the aircraft may also have a current trajectory (e.g., a trajectory at the present time). In some implementations, a trajectory may also refer to other parameters of the aircraft, such as a velocity of the aircraft at different points in time. In some implementations, the velocity of the aircraft may be determined based on the change in position of the aircraft.

The avoidance system 200 may predict the trajectory of an aircraft based on the state of the aircraft. For example, the avoidance system may predict an aircraft's trajectory based on at least one of: 1) the attitude of the aircraft, 2) the position of the aircraft, and 3) the velocity of the aircraft. To predict the trajectory, the avoidance system 200 may extrapolate the future position/velocity of the aircraft based on the historic and/or current state of the aircraft. In some implementations, the avoidance system 200 may predict the trajectory of an aircraft based on a flight plan, such as a flight plan stored on the ownship or received from another aircraft.

In some cases, the pilot may manually pilot the ownship without a specific flight plan, such as during a sightseeing tour or an emergency flight (e.g., an air medical flight). Similarly, in some cases, the pilot may manually pilot the ownship according to a flight plan that is not accessible by the avoidance system 200 (e.g., not stored in memory). In these cases, the ownship may predict the trajectory of the ownship based on factors described herein, other than a stored flight plan.

In some cases, the pilot may control the ownship according to a flight plan that is accessible by the avoidance system 200. For example, the pilot may enter the flight plan into a flight management system (FMS) 202 for storage and reference during flight. In this case, the avoidance system 200 may project/predict the trajectory of the ownship based on the flight plan stored by the FMS 202. For example, the flight plan may include a list of waypoints, where the avoidance system 200 may take into account the next waypoint when making the trajectory prediction. In a more specific example, the trajectory projection/prediction may include the next waypoint and areas near the next waypoint.

In the case where the ownship is controlled by the autopilot (e.g., according to the FMS), the trajectory of the ownship may be projected/predicted according to the flight plan. In these cases, the autopilot may control the ownship to fly in mostly straight paths, with turns when reaching waypoints or performing an approach into an airport. The ownship trajectory under autopilot control may include a small volume around the planned/predicted trajectory (e.g., a tube/cylinder) instead of an expanding cone, as illustrated in FIG. 1. The small volume (e.g., tube/cylinder) may account for flight technical error.

The ownship future trajectory may be referred to as a planned trajectory or as a projected/predicted trajectory, depending on the manner in which the ownship trajectory is controlled. When the ownship is controlled by an autopilot, the trajectory of the ownship may be projected according to a flight plan. When the ownship is manually controlled by a pilot, the trajectory of the ownship may be a predicted trajectory. The ownship future trajectory, whether predicted/projected or planned, may be referred to herein generally as the "ownship trajectory."

FIG. 1 illustrates historical and predicted trajectories of the ownship 100, an intruder 102-1, and another aircraft 102-2. The historical trajectories 110, 112-1, 112-2 are illustrated as broken lines. The projected/predicted trajectories 114, 116-1, 116-2 are illustrated as covering a portion of airspace into which the aircraft may enter at a future time. In some implementations, locations within the predicted trajectories may be associated with a probability that the aircraft will be located in the location. In the case the ownship, or other aircraft, is following a planned trajectory, the planned trajectory may be more defined than those illustrated in FIG. 1. For example, a planned trajectory may be illustrated as a line, or narrower cone, that delineates a more specific future airspace. Although the trajectories are illustrated as two dimensional and triangular in FIG. 1, the trajectories may be calculated in a variety of ways, such as cones, ellipses, and in three dimensions.

The avoidance system 200 may determine a conflict zone 118 based on the ownship trajectory and the intruder trajectory. For example, the avoidance system 200 may determine that a conflict zone exists in a volume where the ownship trajectory intersects with one or more other aircraft predicted trajectories. The determined conflict zone may represent a space in which the ownship may experience a loss of separation with the intruder(s). In one example, the ownship trajectory may intersect with a single intruder predicted trajectory in a single conflict zone. In another example, the ownship trajectory may intersect with multiple intruders in a single conflict zone or in separate conflict zones. The conflict zone 118 in FIG. 1 is illustrated as an overlap between the ownship trajectory 114 and a single intruder predicted trajectory 116-1.

Although the conflict zone 118 is illustrated in two dimensions as an overlap between triangular predicted trajectories, the conflict zone may be calculated in other manners. For example, the conflict zone may be calculated in three dimensions as intersections between other types of geometrical shapes and/or probabilistic distributions for the locations of the ownship and the intruder(s). For example, the conflict zone may be calculated as an intersection between cones, lobes, and/or other geometries. The shape of conflict zones may also depend on how trajectories are calculated and how the trajectories intersect with one another. As such, the conflict zones illustrated and described herein are only example conflict zones. In some implementations, the conflict zone may also include a time dimension. For example, the presence of a conflict zone and/or the shape of the conflict zone may change over a period of time. In a specific example, different conflict zone geometries may be associated with different future times.

The ownship 100 and other aircraft 102-1, 102-2 may be in communication with the ATC 106. For example, the pilot(s) may communicate via radio with the ATC 106. The pilot(s) and the ATC 106 may exchange a variety of information, such as information related to the proximity of other aircraft, weather information, authorization to land, and sequencing of aircraft. Although a runway 104 is illustrated, other touchdown areas may include, but are not limited to, a heliport, a vertiport, a seaport, unprepared landing areas, and a moving touchdown area (e.g., an aircraft carrier). Although a single runway at a single airport is illustrated in FIG. 1, one or more airports may each include one or more runways.

The ownship 100 may communicate with the AOC 108. For example, the ownship 100 may communicate with the AOC 108 via a data connection and/or via a radio relay located on the aircraft. The AOC 108 may monitor and/or control operation of the ownship. For example, human operators at the remote AOC 108 may monitor/control ownship operations. In a specific example, the AOC 108 may send flight commands to the ownship 100 and receive data from the ownship 100 and other sources. In some implementations, a human operator at the AOC 108 may be in contact with the ATC 106.

Figure 2A:
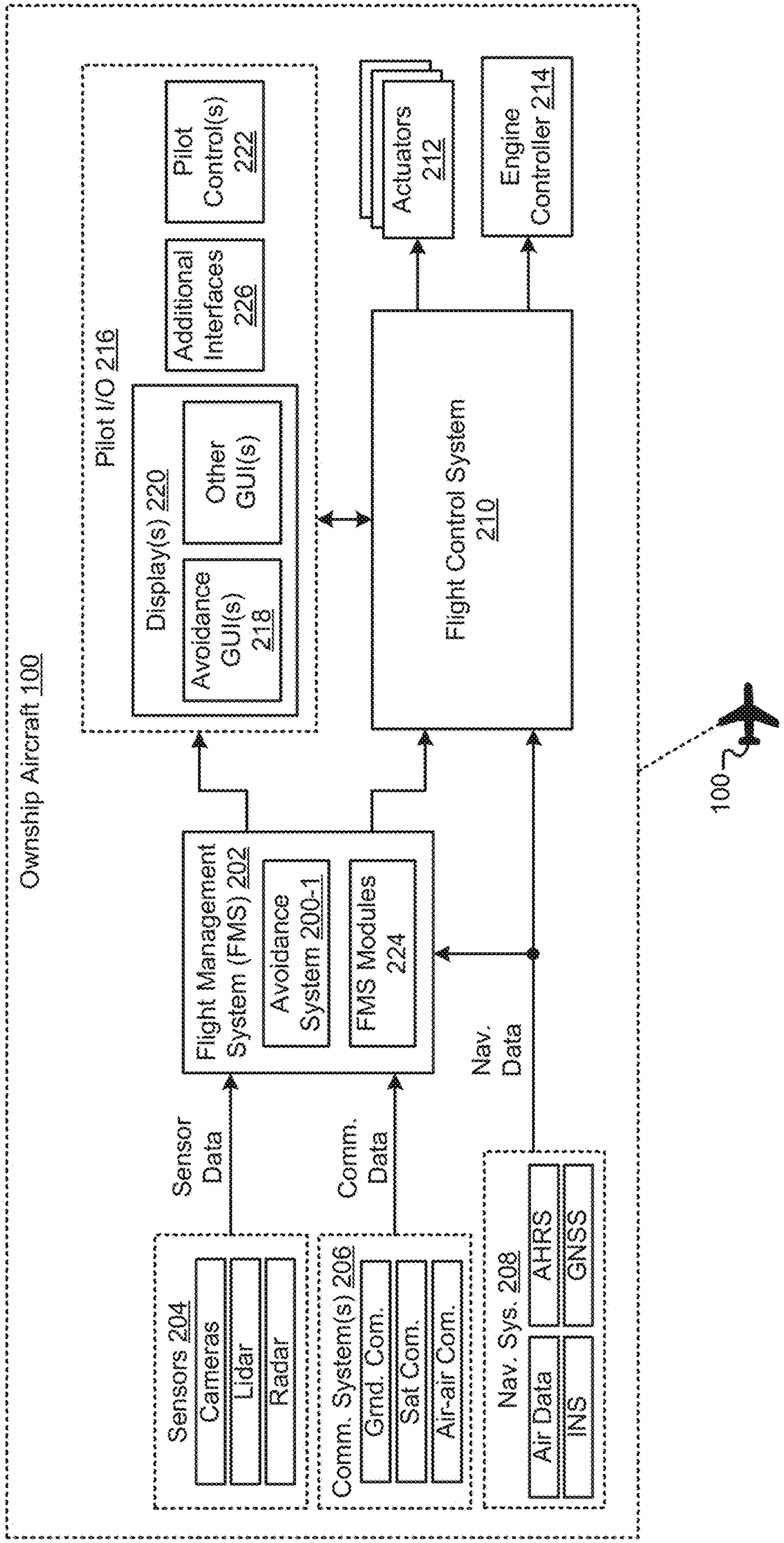
FIGS. 2A-2G illustrate example implementations of an avoidance system included in an aircraft and/or aircraft operations center.
Figure 2B:
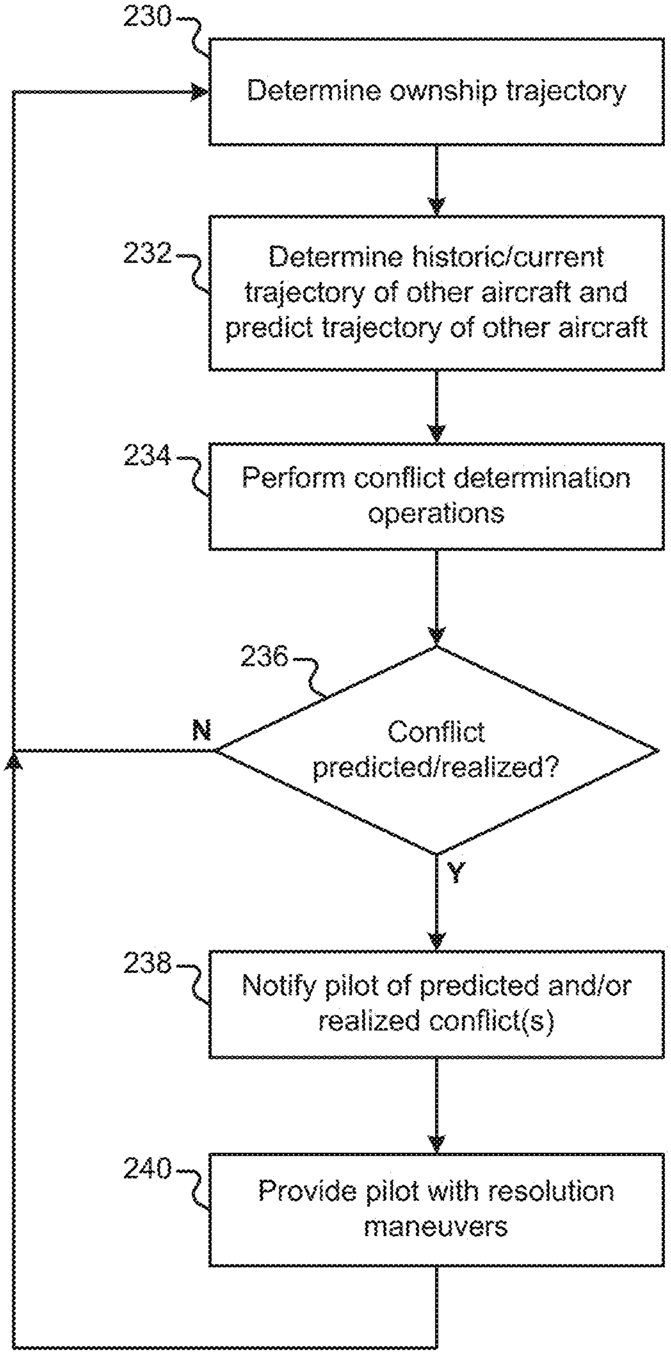
Figure 2C:
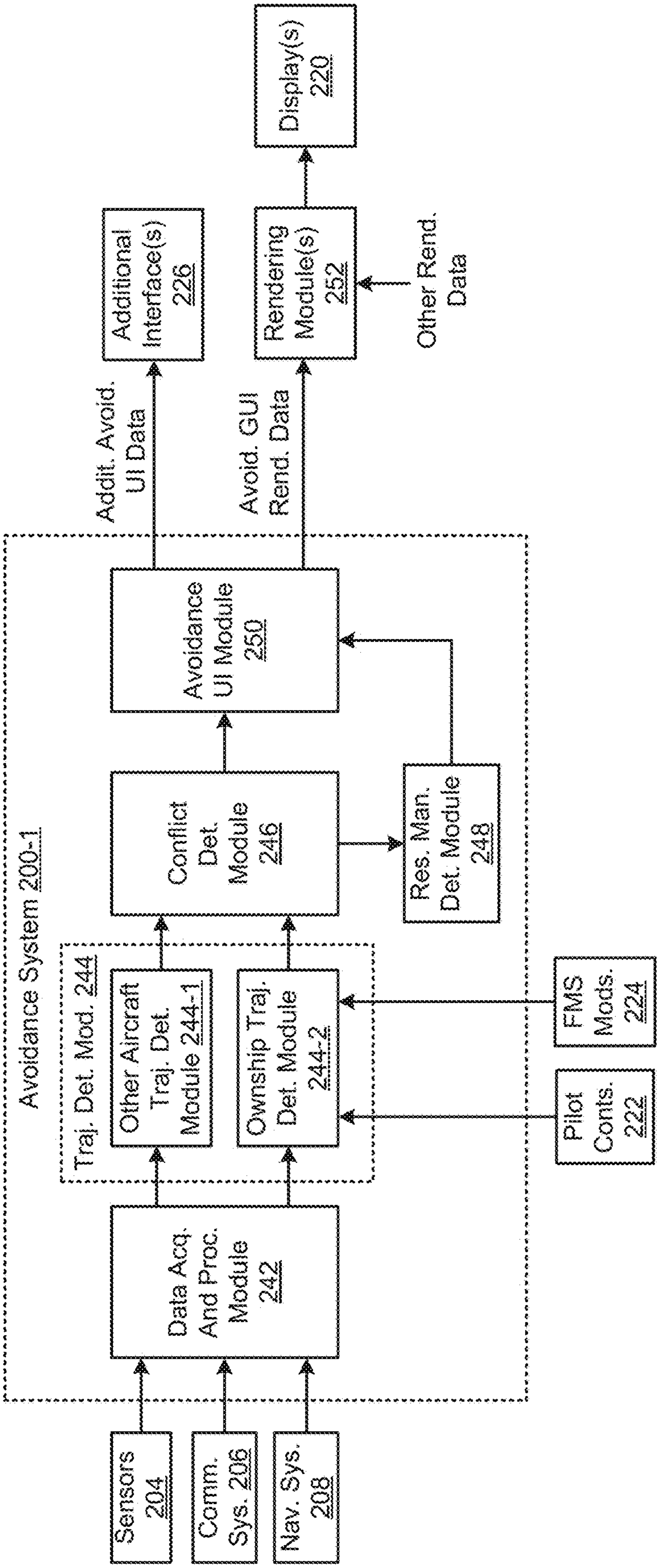
Figure 2D:
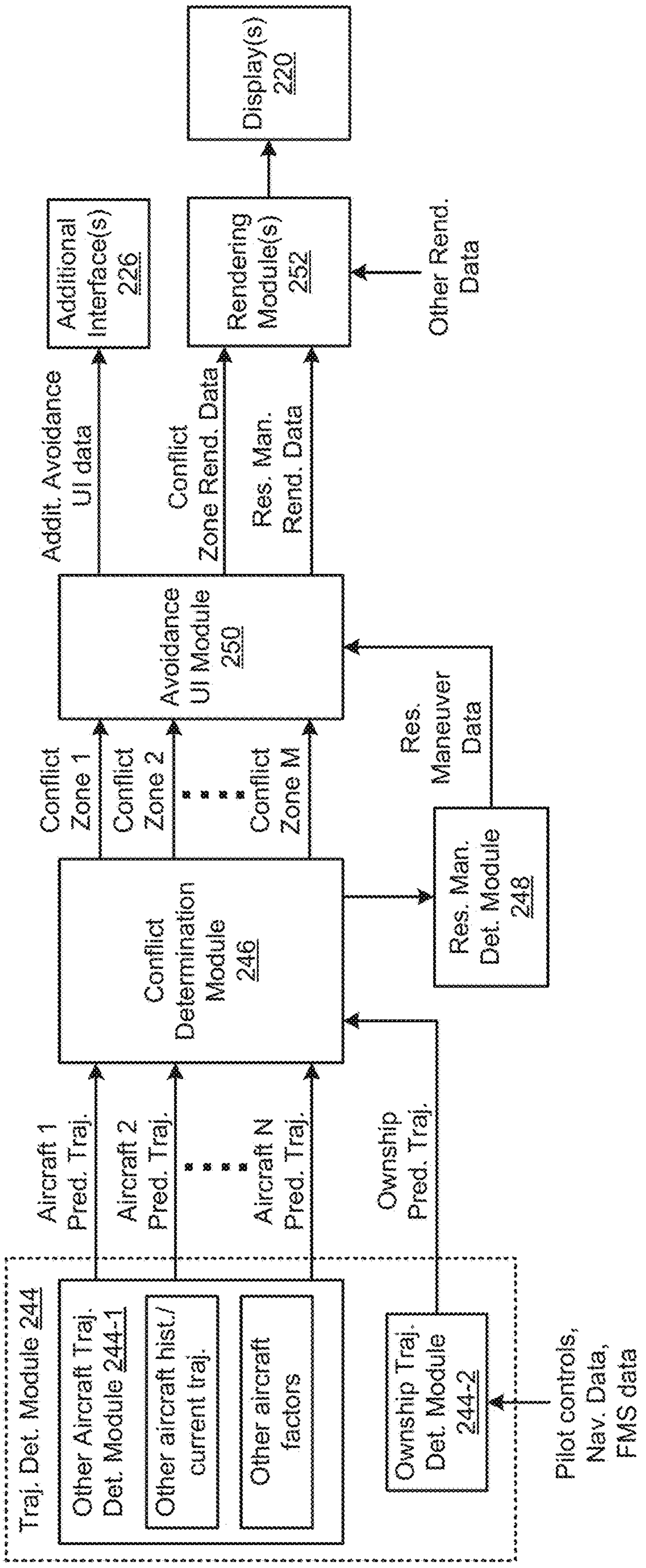
Figure 2E:
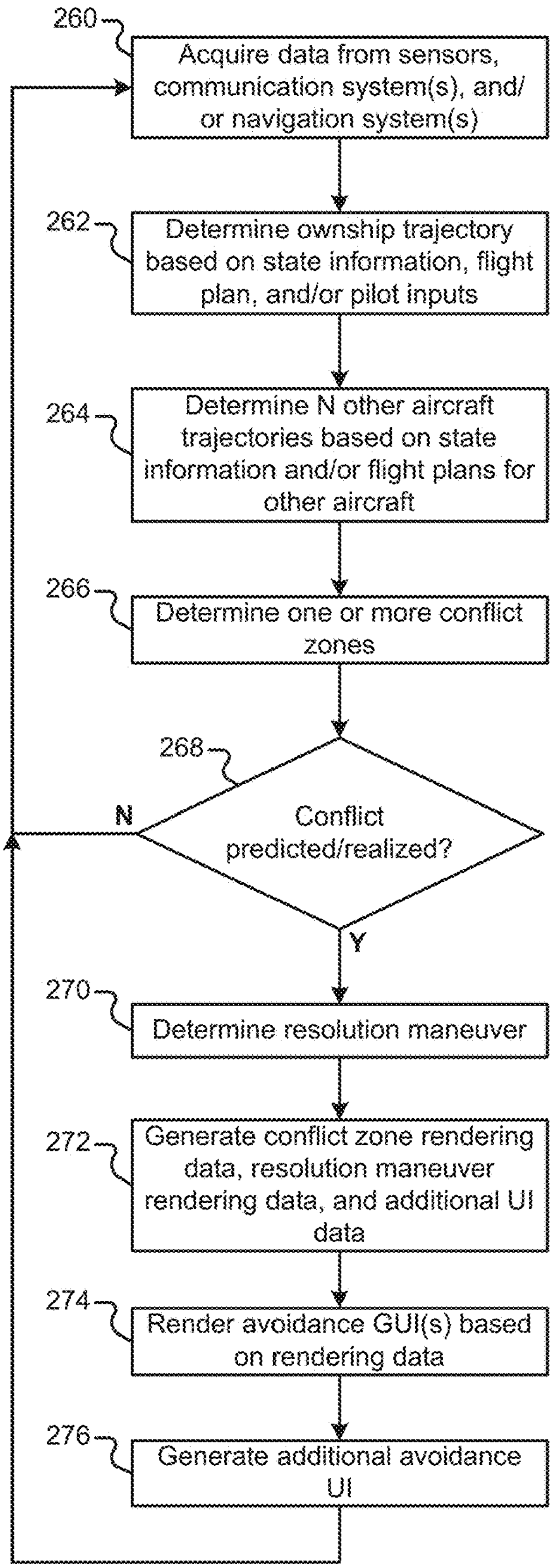
Figure 2F:
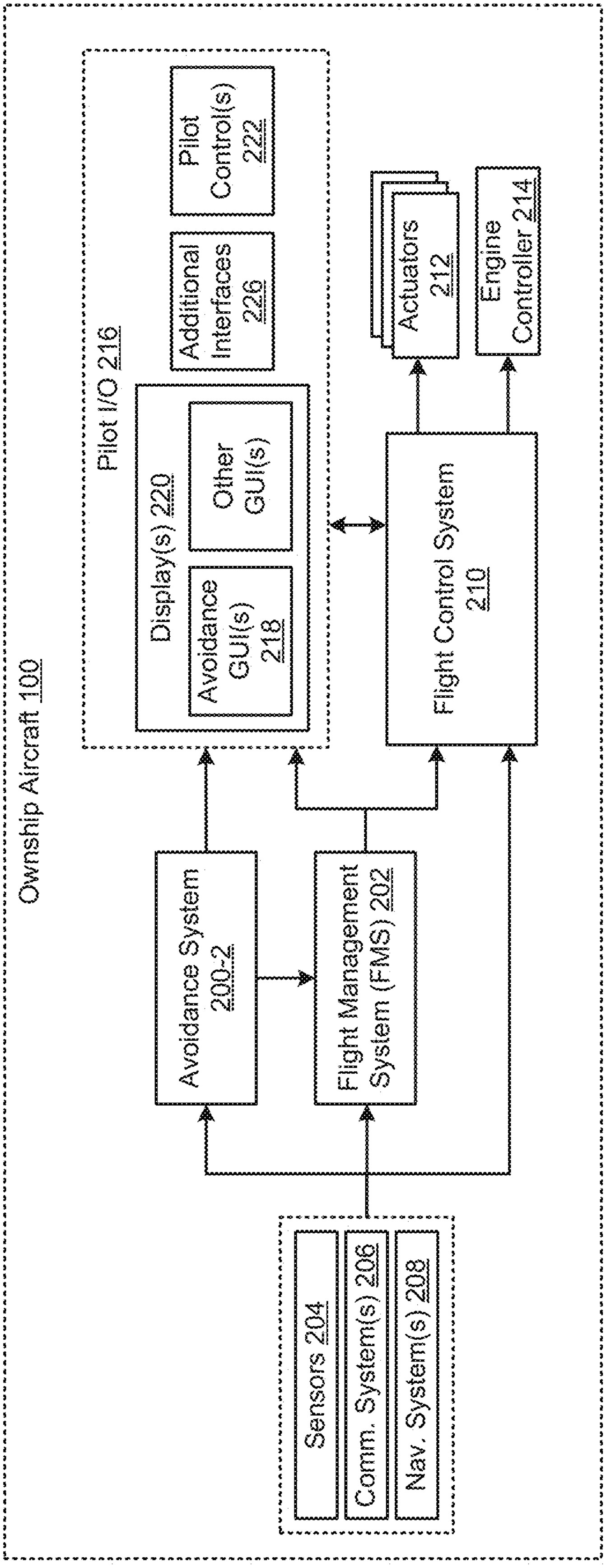
Figure 2G:
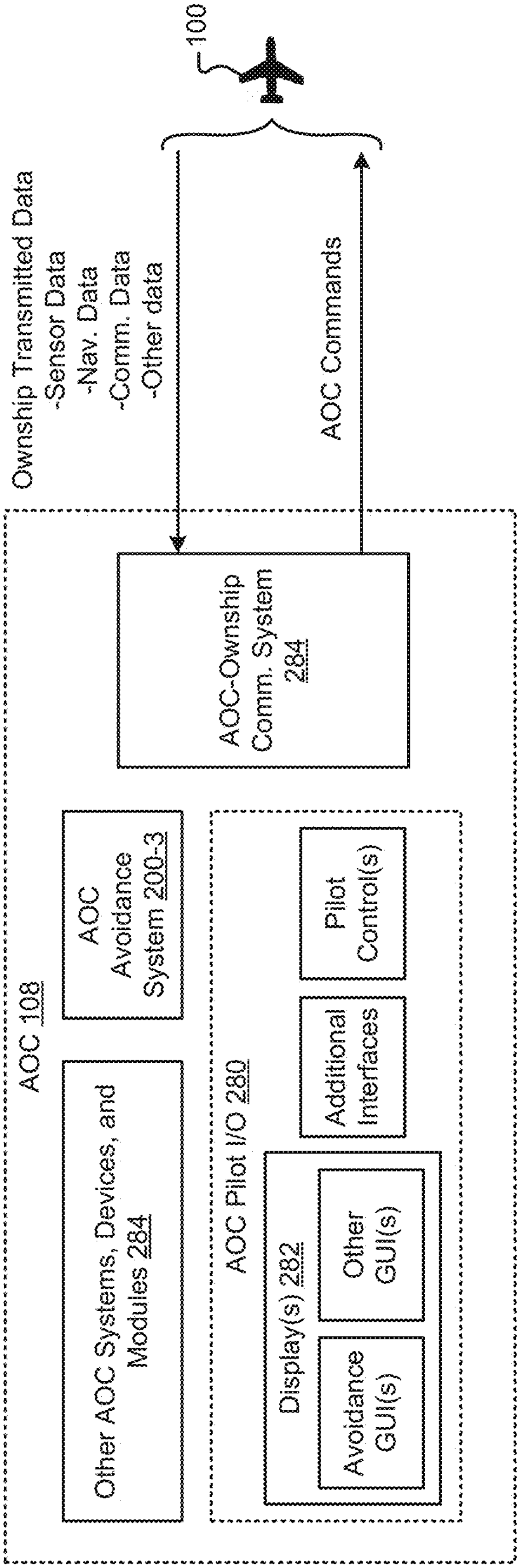

The avoidance system 200, or components of the avoidance system 200, may be implemented in the AOC 108 (e.g., see FIG. 2G). Accordingly, one or more features of the avoidance system 200 described herein may be implemented at the AOC 108. For example, the AOC 108 may include computing devices that predict the trajectories of aircraft, determine realized/potential conflicts, and/or generate avoidance GUIs. In some implementations, the AOC 108 may include one or more displays and pilot controls that are operated by a pilot located in the AOC 108. In this example, the display(s) at the AOC 108 may display the avoidance GUIs and additional UI.

FIGS. 2A-6G illustrate and describe features of the avoidance system 200. FIGS. 2A-2E describe an example ownship 100 that includes an avoidance system 200. For example, FIGS. 2A-2E describe an ownship 200 that predicts aircraft trajectories, determines conflict zones, and generates avoidance GUIs. FIGS. 2F-2G illustrate alternative implementations of the avoidance system 200 in the ownship 100 and AOC 108, respectively. FIGS. 3A-3J illustrate example avoidance GUIs that include rendered conflict zones. FIGS. 4A-4C illustrate example avoidance GUIs indicating that the ownship may enter a conflict zone. FIGS. 5A-5D illustrate example avoidance GUIs that include rendered conflict zones generated in response to multiple intruders. FIGS. 6A-6G illustrate example avoidance GUIs including maneuver indicators.

FIG. 2A is a functional block diagram of an example ownship 100 that may implement an avoidance system 200-1. The ownship 100 of FIG. 2A includes: 1) sensors 204, 2) communication systems 206, 3) navigation systems 208, 4) an FMS 202, 5) a flight control system 210, 6) actuators 212, 7) an engine controller 214, and 8) pilot input/output (I/O) 216. The ownship 100 may acquire data from the sensors 204, communication systems 206, and navigation systems 208. The FMS 202, including an avoidance system 200-1, may assist the pilot in navigation and avoidance of conflict zones. For example, the avoidance system 200-1 may generate avoidance GUIs 218 on one or more displays 220 included in the pilot I/O 216. The pilot may control the ownship 100 using the pilot controls 222 included in the pilot I/O 216. In some implementations, the flight control system 210 (e.g., an autopilot) may control the ownship 100.

The ownship 100 includes a navigation system 208 that generates navigation data. The navigation data may indicate the location, altitude, velocity, heading, and attitude of the ownship 100. The navigation system 208 may include a Global Navigation Satellite System (GNSS) receiver that indicates the latitude and longitude of the ownship. The navigation system 208 may also include an attitude and heading reference system (AHRS) that may provide attitude and heading data for the ownship, including roll, pitch, and yaw. The navigation system 208 may include an air data system that may provide airspeed, angle of attack, sideslip angle, altitude, and altitude rate information. The navigation system 208 may include a radar altimeter and/or a laser altimeter to provide Above Ground Level (AGL) altitude information. The navigation system 208 may also include an inertial navigation system (INS).

The ownship 100 may include a plurality of sensors 204 that generate sensor data, such as sensor data that can be used to detect other aircraft. For example, the ownship 100 may include one or more radar systems, one or more electro-optical (E/O) cameras, one or more infrared (IR) cameras, and/or light detection and ranging systems (LIDAR). The LIDAR systems may measure distance to a target by illuminating the target with laser light and measuring the reflected light with a sensor. The radar systems and cameras may detect other aircraft. Additionally, the sensors 204 (e.g., cameras and LIDAR) may determine whether the runway is clear when approaching for a landing. In some implementations, potential obstacles (e.g., surrounding air traffic and weather) may be identified and tracked using at least one of, onboard and offboard radar, cameras, Automatic Dependent System-Broadcast (ADS-B), Automatic Dependent System-Rebroadcast (ADS-R), Mode C transponder, Mode S transponder, Traffic Collision Avoidance System (TCAS), Traffic Information Service-Broadcast (TIS-B), Flight Information Service-Broadcast (FIS-B), and similar services. The data from these sensors and services may be fused and analyzed to understand and predict the behavior of other aircraft in the air or on the ground.

The ownship 100 may include one or more communication systems 206. For example, the ownship 100 may include one or more satellite communication systems, one or more ground communication systems, and one or more air-to-air communication systems. The communication systems 206 may operate on a variety of different frequencies. In some implementations, the communication systems 206 may form data links. In some implementations, the communication systems 206 may transmit a flight path data structure to the AOC 108 and/or to the ATC 106. The communication systems 206 may gather a variety of information, such as traffic information (e.g., location and velocity of aircraft), weather information (e.g., wind speed and direction), and notifications about airport/runway closures. In some implementations, a voice connection (e.g., ATC communication over radio VHF) may be converted to text for processing. In some implementations, the ownship can broadcast their own position and velocity (e.g., to the ground or other aircraft).

The ownship 100 may include an FMS 202. The FMS 202 may include the avoidance system 200-1 and additional FMS modules 224. The FMS modules 224 may perform functionality attributed to the FMS 202 herein. In addition to the avoidance system features, the FMS 202 may also include additional features that are not typically included in an FMS, such as additional vehicle management features. The features included in the FMS may vary, depending on the type of aircraft and the specific features of the aircraft.

Although the FMS 202 is illustrated and described herein as including the avoidance system 200-1, the avoidance system may be implemented in other manners. For example, the avoidance system 200 may be implemented in the AOC 108 (e.g., see FIG. 2G). As another example, the avoidance system 200 may be implemented as a stand-alone system on the ownship 100 (e.g., see FIG. 2F). In some implementations, the avoidance system 200 may include its own set of sensors, communication system(s), and/or navigation system(s). In some implementations, the avoidance system 200 may share a portion of sensors, communication system(s), and navigation system(s) with other components of the ownship.

In some implementations, the FMS 202 may receive and/or generate one or more flight path data structures that the ownship may use for navigation. A flight path data structure may include a sequence of waypoints that each indicate a target location for the ownship over time. A waypoint may indicate a three-dimensional location in space, such as a latitude, longitude, and altitude (e.g., in meters). Each of the waypoints in the flight path data structure may also be associated with additional waypoint data, such as a waypoint time (e.g., a target time of arrival at the waypoint) and/or a waypoint speed (e.g., a target airspeed in knots or kilometers per hour). Although a flight path data structure may include waypoints, in some implementations, a flight path data structure may include other trajectory definitions, such as trajectories defined by splines (e.g., instead of discrete waypoints) and/or a Dubins path (e.g., a combination of a straight line and circle arcs).

An autopilot, pilot, and/or remote operator may control the ownship according to the generated flight path data structure. For example, a flight path data structure may be used to land the ownship, takeoff from a runway, navigate en route to a destination, and/or hold the ownship in a defined space. In some implementations, the flight path may be displayed to the pilot on a display so that the pilot may follow the flight path. Some flight paths, or portions of flight paths, may be referred to as flight patterns. For example, a flight path near an airport may be referred to as an airfield traffic pattern (e.g., a takeoff pattern, landing pattern, etc.).

The FMS 202 may acquire a variety of types of data for use in generating a flight path data structure. Example data may include, but is not limited to, sensor data (e.g., vision-based data and radar data), navigation data (e.g., GNSS data and AHRS data), static data from databases (e.g., an obstacle database and/or terrain database), broadcasted data (e.g., weather forecasts and notices to airmen), and manually acquired data (e.g., pilot vision, radio communications, and air traffic control inputs). Additionally, the FMS 202 (e.g., avoidance system 200) may detect, track, and classify surrounding traffic as well as predict their behavior.

The FMS modules 224 may include a guidance loop module. The guidance loop module may receive the flight path data structure and additional information regarding the state of the ownship, such as a current location (e.g., a latitude/longitude/altitude), velocity, and aircraft attitude information. Based on the received information, the guidance loop module may generate autopilot commands for the flight control system 210 (e.g., an autopilot system included in the flight control system 210). Example autopilot commands may include, but are not limited to, a heading command, an airspeed command, an altitude command, and a roll command.

The FMS modules 224 may include an ATC manager module and a weather manager module. The ATC manager module may acquire ATC information. For example, the ATC manager module may interact with and request clearances from the ATC 106 via VHF, satellite, and/or a data connection (e.g., the Internet). ATC traffic information may provide guidance and/or clearances for various operations in controlled airspace. The information from the ATC 106 may come from a radio using speech-to-text recognition or a digital data-link, such as Controller Pilot Data Link Communications (CPDLC) or from the Unmanned Traffic Management (UTM) System. The weather manager module may acquire the current and future weather information in the vicinity of the destination airport as well as any other source for weather in between the current location and the destination airport. The weather information can be provided via satellite, Internet, VHF, onboard weather radar, and Flight Information Services-Broadcast (FIS-B). The information from these and other sources may be fused to provide a unified representation of wind, precipitation, visibility, etc.

The FMS modules 224 may include additional planning modules for en route planning, taxiing, and/or holding. The FMS modules 224 may also include modules for vehicle management, such as optimizing fuel and trajectory based on the performance of the ownship. In some implementations, the FMS modules 224 may also include a contingency/emergency management module.

The flight control system 210 may generate control commands that control the ownship 100. For example, the flight control system 210 may generate commands that control the actuators 212 and the engines (e.g., via the engine controller 214). The flight control system 210 may control the ownship according to pilot inputs from the pilot controls and/or commands generated by the FMS 202 (e.g., autopilot commands).

The flight control system 210 may include an autopilot system. The autopilot system may control the ownship based on autopilot commands received from the FMS 202. For example, the autopilot system can output control signals/commands that control actuators 212 and engines on the ownship. In a specific example, the output of the autopilot system may include actuator position commands and engine thrust commands. The autopilot system may control a variety of aircraft parameters, such as heading, speed, altitude, vertical speed, roll, pitch, and yaw of the aircraft.

The ownship may include a plurality of control surfaces. Example control surfaces may include, but are not limited to, ailerons, tabs, flaps, rudders, elevators, stabilizers, spoilers, elerudders, ruddervators, flaperons, landing gears, and brakes for fixed-wing aircraft. Rotorcraft may include other controls/surfaces (e.g., rotor collective, cyclic, and tail rotor). The ownship 100 can include actuators/linkages 212 that control the control surfaces based on the commands generated by the pilot controls and/or the autopilot. The actuators and linkages may vary, depending on the type of aircraft.

The ownship 100 may include an engine controller 214 that controls one or more engines. The engine controller 214 may control the engine(s) based on the received engine commands, such as thrust commands that indicate an amount of thrust. For example, the engine controller 214 may control fuel and other engine parameters to control the engines according to the received engine commands. In some implementations, the engine controller 214 may include a full authority digital engine control (FADEC) that controls the engines. Example engines may include, but are not limited to, a piston engine, turboprop, turbofan, turbojet, jet, and turboshaft. In some implementations, the ownship may include one or more electric motors. In some implementations, the ownship may include a propeller system. In these implementations, a lever may control the pitch/RPM of the propeller.

The autopilot may receive autopilot commands from the FMS 202 and/or the pilot controls 222 (e.g., on the ownship 100 and/or from the AOC 108). The autopilot may operate in a plurality of different modes. In one example mode, the autopilot receives data from the FMS 202 (e.g., a flight path data structure) and the autopilot controls the aircraft according to the data received from the FMS 202 (e.g., autopilot commands). In another mode, the pilot may use the pilot controls 222 (e.g., on a control panel/screen) to generate control inputs for the autopilot. For example, the autopilot may receive commands from the pilot controls 222 that provide the autopilot with at least one of: 1) a desired altitude, 2) a desired heading, 3) yaw damper (e.g., to coordinate the turns with the rudder), 4) a desired airspeed (e.g., using engine control), 5) a desired climb/descent rate, and 6) a desired holding pattern. The autopilot may control the aircraft according to the received commands.

The avoidance system 200 may use data from the navigation system 208, sensors 204, and communication system 206 in order to determine the historic/current state of the ownship and other aircraft. For example, the avoidance system 200 may determine historic/current attitude, position, and/or velocity of the ownship and other aircraft. Based on the state information, the avoidance system 200 may determine the historic/current trajectory of the ownship and other aircraft. The avoidance system 200 may predict the trajectories of the ownship and other aircraft based on the historic/current state information (e.g., historic/current trajectories). The avoidance system 200 may also determine whether there is a predicted/realized conflict and generate avoidance GUIs based on the predicted/realized conflict.

The ownship may include interfaces for the pilot, referred to herein as pilot input/output (I/O) devices 216. The pilot I/O 216 may include pilot controls 222, one or more displays 220, and additional interfaces 226. The pilot controls 222 include devices used by the pilot to control the ownship, such as a flight yoke, throttle lever, and manual buttons/switches. The displays 220 can display one or more GUIs, some of which may include GUIs that include avoidance GUI elements. GUIs that include avoidance GUI elements may be referred to herein as "avoidance GUIs." Additional interfaces may include audio interfaces (e.g., speakers, headphones, microphones, etc.), haptic feedback, and other I/O devices, such as readouts, gauges, and additional interfaces not associated with avoidance.

The displays 220 may include a variety of display technologies and form factors, including, but not limited to: 1) a display screen (i.e., monitor), such as a liquid-crystal display (LCD) or an organic light emitting diode (OLED) display, 2) a HUD, 3) a helmet mounted display, 4) a head mounted display, 5) augmented reality glasses/goggles, and/or 6) a standalone computing device (e.g., a tablet computing device). The displays 220 may provide different types of functionality. In some implementations, a display may be referred to as a primary flight display (PFD). The PFD may display a variety of information including, but not limited to, an attitude indicator, an airspeed indicator, an altitude indicator, a vertical speed indicator, a heading, and navigational marker information. In some implementations, a display may be referred to as a multi-function display (MFD). An MFD may refer to an auxiliary display/interface that may display a variety of data, such as a navigation route, in conjunction with a primary flight display.

The ownship may include different types of displays that include GUIs that are rendered based on a variety of data sources (e.g., sensors, navigation systems, communication systems, pilot input, etc.). The ownship may include rendering modules (e.g., see FIGS. 2C-2D) that include hardware and software (e.g., APIs) that renders the GUIs and other information on the displays 220 based on data from the variety of data sources. The data used to render the GUIs on the displays 220 may be referred to herein as rendering data. The rendering modules may receive the rendering data and render the GUIs described herein. The rendering data may include avoidance rendering data that the rendering modules may use to render the avoidance GUI elements. For example, the avoidance rendering data may include conflict zone rendering data and resolution maneuver indicator rendering data used to render the conflict zone(s) and the maneuver indicators, respectively.

The different displays and GUIs described herein are only examples. As such, the avoidance GUI elements may be included on other displays and GUIs than those explicitly illustrated and described herein. In some implementations, one or more dedicated displays may be dedicated to displaying avoidance GUIs. For example, the ownship and/or the AOC may include one or more dedicated avoidance GUI displays.

The avoidance system 200 may generate a variety of different avoidance GUI elements. One example avoidance GUI element is a rendered conflict zone (hereinafter "rendered zone") that graphically represents the conflict zone. Put another way, the rendered zone may graphically represent a zone in which the ownship may conflict with an intruder aircraft (e.g., cause a loss of separation). Another example avoidance GUI element is a rendered maneuver indicator that graphically represents one or more maneuvers (e.g., a recommended maneuver) that the ownship may make to avoid entering a potential conflict zone and/or recover from a realized conflict (e.g., loss of separation).

The avoidance GUI elements may be rendered in a variety of different viewpoints. For example, the avoidance GUI elements may be rendered in a first person view (FPV) (e.g., see FIGS. 3A-3E), a third person view (e.g., see FIG. 3H), and/or a top down view (e.g., see FIG. 3F). In some implementations, the avoidance GUI elements may be included in a rendered environment (e.g., see FIG. 3F) that may include rendered terrain, aircraft, and/or other objects. In some implementations, the avoidance GUI elements may be included in other environments, such as photorealistic environments generated based on acquired camera/video footage (e.g., see FIG. 3J).

The ownship 100 may include additional interfaces 226 that may interact with the avoidance system 200. For example, the additional interfaces 226 may include audio devices, such as speakers and headphones. The audio devices may generate avoidance audio cues, such as sounds and/or voices that notify the pilot of a potential and/or realized conflict. The avoidance audio cues may also notify the pilot of potential avoidance maneuvers. Additional interfaces 226 may also include haptic feedback devices that may generate avoidance haptic feedback that notify the pilot of a potential and/or realized conflict. Additional input devices may include touchscreen interfaces (e.g., overlaying a display). In some implementations, the additional interfaces 226 may include input devices that the pilot may use to enable/disable aspects of the avoidance system 200, such as the audio cues and/or avoidance GUI elements. Example input devices for enabling/disabling aspects of the avoidance system 200 may include a touchscreen interface (e.g., a GUI button) and/or a physical button/switch.

FIG. 2B is an example method describing operation of the ownship 100 illustrated in FIG. 2A. In block 230, the avoidance system 200-1 determines the ownship trajectory (e.g., predicted or planned). In block 232, the avoidance system 200-1 determines the historic/current trajectory of one or more other aircraft and predicts the trajectory of the one or more other aircraft. In some implementations, the avoidance system 200-1 may determine the trajectories in block 230 and block 232 concurrently.

In block 234, the avoidance system 200-1 performs conflict determination operations. The conflict determination operations may include determining whether one or more of the predicted trajectories of the other aircraft may conflict with the ownship trajectory. The conflict determination operations may also include determining whether any of the other aircraft are currently in conflict with the ownship. The conflict determination operations may also include determining one or more conflict zones associated with the one or more determined conflicts. In some implementations, the conflict determination operations may include the determination of safe maneuvers (e.g., ranges/combinations of safe maneuvers) as well as maneuvers (e.g., ranges/combinations) that may lead to a conflict. If there is not a predicted/realized conflict in block 236, the method continues in block 230.

If there is a predicted/realized conflict with one or more other aircraft, the method continues in block 238. In block 238, the avoidance system 200-1 may notify the pilot of the predicted/realized conflict(s). For example, the avoidance system 200-1 may generate avoidance GUI elements (e.g., rendered zones) and/or other avoidance UI (e.g., audio). In block 240, the avoidance system 200-1 may calculate one or more resolution maneuvers and provide the pilot with the calculated resolution maneuvers, such as by rendering a maneuver indicator and/or providing other avoidance UI elements (e.g., audio).

FIGS. 2C-2D are functional block diagrams of an example avoidance system 200-1. The avoidance system 200-1 includes a data acquisition and processing module 242 (hereinafter "data processing module 242") that receives data from the sensors 204, communication systems 206, and navigations systems 208. The data processing module 242 may combine tracking data from the different sources, such as tracking data from radar data, camera data, LIDAR data, etc. In some cases, some tracking data from different sources may be for the same one or more aircraft. In these cases, the data processing module 242 may combine (e.g., "fuse") tracking data from different sources for the same aircraft. The data processing module 242 may output final tracking data that includes tracking data from one or more sources for each aircraft.

The avoidance system 200-1 includes a trajectory determination module 244 that determines the trajectories of the ownship and the other aircraft based on the processed data (e.g., received from the data processing module 242). For example, the trajectory determination module 244 may include another aircraft trajectory determination module 244-1 that determines the predicted trajectories of the other aircraft based on the processed data. Additionally, the trajectory determination module 244 may also include an ownship trajectory determination module 244-2 that determines the ownship trajectory based on the processed data and other data, such as input from the pilot controls 222 and the FMS modules 224.

A projected/predicted trajectory may refer to a calculated volume of space, or multiple volumes of space, that may include an aircraft at a future time. Put another way, a projected/predicted trajectory may refer to an extrapolated trajectory of an aircraft. The volume of space included in a predicted trajectory may be represented using a variety of geometries, depending on the manner in which the predicted trajectory is calculated. Example volumes may include cones, pyramids, prisms, ellipsoids, irregular volumes, and/or other geometries. The different possible locations of the aircraft in the predicted trajectory may be defined by a three-dimensional location in space, such as a latitude, longitude, and altitude (e.g., in meters). Each of the possible locations in the predicted trajectory may also be associated with additional data, such as a time (e.g., a target time of arrival at the location) and/or a speed at the location (e.g., an airspeed in knots or kilometers per hour).

Trajectories may be predicted using techniques that produce associated probability values. For example, predicted trajectory values (e.g., location values) can include associated probability values. The probability values may indicate the probability that the predicted trajectory value (e.g., location) may occur. For example, a predicted trajectory volume may include different probability values for different locations in the predicted volume. As another example, when multiple trajectories for an aircraft are predicted, each predicted trajectory may be associated with a different probability value. In some implementations, the predicted trajectories may be calculated according to various predicted trajectory weightings, such as applying heavier weightings to a straight line path and lighter weightings to other maneuvers.

The trajectory determination module 244 may determine one or more trajectory predictions for each aircraft. For each aircraft, the trajectory determination module 244 may include an associated trajectory data structure that includes data for one or more trajectory predictions. For example, the trajectory data structure may include locations, velocities, times, and additional data (e.g., probability values) for the aircraft for one or more predicted trajectories for each aircraft.

The trajectory determination module 244 may predict the trajectory of the ownship based on the state of the ownship. For example, the trajectory determination module 244 may predict the ownship trajectory based on at least one of: 1) the attitude of the ownship, 2) the position of the ownship, 3) the velocity of the ownship, 4) airspeed, 5) static pressure, 6) wind information, and 7) pilot input. The trajectory determination module 244 may predict the ownship trajectory using data acquired from onboard sensors that may include, but are not limited to, the INS, the air sensors, navigation data (e.g., GPS/GNSS), Compass, VOR (VHF Omnidirectional Range), DME (Distance Measuring Equipment), and TACAN. The trajectory determination module 244 may extrapolate the future position/velocity of the ownship based on the past and/or current state of the ownship.

In some implementations, the trajectory determination module 244 may predict the ownship trajectory based on external factors, such as weather information and/or airspace constraints. Example weather information may include, but is not limited to, wind speed and direction. An example airspace constraint may include altitude. For example, the ownship altitude may limit maximum airspeed and/or descent rate.

In cases where the ownship is being operated according to a flight plan (e.g., by the autopilot), the trajectory determination module 244 may determine the ownship trajectory based on the flight plan. For example, the avoidance system 200 may determine that the ownship trajectory will follow the flight plan (e.g., within a margin of error).

The trajectory determination module 244 may predict the trajectory of the other aircraft based on the state of the other aircraft. For example, the trajectory determination module 244 may predict the trajectory of the other aircraft based on at least one of: 1) the attitude of the other aircraft, 2) the position of the other aircraft, and 3) the velocity of the other aircraft. For example, the trajectory determination module 244 may extrapolate the future position/velocity of the other aircraft based on the past and/or current state of the other aircraft. The trajectory determination module 244 may determine the state of the other aircraft using a combination of sensors described herein.

The trajectory determination module 244 may detect, track, and classify surrounding traffic as well as predict their behavior. The trajectory determination module 244 may receive data that includes ADS-B data, TIS-B data, TCAS data, Mode C data, Mode S data, camera data, radar data, LIDAR data, and other traffic data. The trajectory determination module 244 may determine traffic classification data that includes tracking data that indicates a location and direction of other aircraft, along with additional data that characterizes the other aircraft, such as the other aircraft's predicted runway and current leg.

The trajectory determination module 244 receives data (e.g., sensor data). Example data may include, but is not limited to, radar data, camera data (e.g., images), LIDAR data, ADS-B traffic data, traffic collision avoidance system (TCAS) data, and data from Mode-C and Mode-S transponders. The various sensors may be used to detect moving objects. Radar, cameras, LIDAR, Mode C data, and Mode S data may provide target locations that are in a frame of reference relative to the sensor itself. The target locations may then be geo-referenced in a global reference system using attitude, rate, velocity, and position information from an on-board INS coupled with a GNSS that may rely on a combination of GPS, Beidou, Galileo, and Glonass. The geo-registration may be performed using accurate timing to precisely determine the location and velocity of the targets. ADS-B, ADS-R, and TIS-B may provide target locations in a global frame of reference. Although the targets may be geo-referenced in a global reference, in some cases, the targets may be tracked in a relative reference frame.

The trajectory determination module 244 may generate tracking data. The tracking data may indicate the current location/velocity of the other aircraft. In some implementations, the tracking data may include the type of aircraft as well, such as an airplane, helicopter, or balloon. The type of aircraft may be determined based on data, such as camera imagery, radar signatures, observed maneuvering capabilities, ADS-B information, and/or tail number information (e.g., from a database). The trajectory determination module 244 may generate tracking data based on a variety of sources of data. For example, the trajectory determination module 244 may generate tracking data based on 1) radar data, 2) camera data (e.g., images), 3) LIDAR data generated by the LIDAR, 4) ADS-B traffic data, 5) TCAS data, 6) Mode C data, 7) Mode S data, and 8) additional and/or alternative data, such as ground radar transmitted radio-frequency (RF) signals including traffic information system broadcast (TIS-B). The trajectory determination module 244 may generate tracking data based on one or more sensors. For example, the trajectory determination module 244 may generate tracking data based on a single sensor. As another example, the trajectory determination module 244 may generate tracking data by fusing data from a plurality of sensors in order to produce more accurate tracking data.

The trajectory determination module 244 may determine traffic classification data based on the final tracking data. Traffic classification data may include tracking data for each aircraft along with additional classifications/predictions associated with the aircraft. For example, the traffic classification data may indicate whether an aircraft is in a specific traffic pattern (e.g., a landing pattern, takeoff pattern, or holding pattern) along with which leg of the traffic pattern (e.g., a downwind leg). Additionally, the traffic classification data may indicate the runway on which the aircraft is likely to land.

In some implementations, the other aircraft may be controlled according to flight plans. For example, other aircraft may be manually controlled and/or auto-pilot controlled according to their flight plans. In the case another aircraft is controlled according to a flight plan, the trajectory determination module 244 may project/predict the trajectory of the other aircraft based on the flight plan. For example, the trajectory determination module 244 may determine that the other aircraft trajectory will follow the flight plan (e.g., within a margin of error). In some implementations, the ownship may receive the flight plans used by the other aircraft. For example, the other aircraft may broadcast their flight plans to the ownship directly (e.g., in response to an interrogation), or the other aircraft may broadcast their flight plans to a ground-based communication system, which may then transmit the flight plans to the ownship. In some implementations, the environment may include a centralized traffic management system (not illustrated) that may receive and share trajectories for some/all of the aircraft in the airspace. The centralized traffic management system may be part of the AOC 108 and/or implemented as a stand-alone system that shares data with the AOC 108 and/or other aircraft in the vicinity.

In some implementations, the trajectory determination module 244 may also take into account the location of the aircraft when making trajectory predictions. For example, at high altitude, an aircraft may tend to fly in a straighter trajectory than when the aircraft is near an airport. In these examples, predictions for aircraft at high altitudes may include more linear trajectory extrapolations. As another example, when an aircraft is near an airport, the aircraft may maneuver towards a runway. In this example, predictions for aircraft near airports may include trajectory extrapolations that include one or more predicted landing locations for the aircraft.

The avoidance system 200-1 includes a conflict determination module 246 that determines whether there are conflicts with one or more other aircraft. For example, the conflict determination module 246 may determine one or more conflict zones based on the current location and/or predicted trajectory of other aircraft and the ownship. In some implementations, the conflict determination module 246 may determine that a conflict zone is located at the intersection (e.g., overlap) between the ownship trajectory and a predicted trajectory of another aircraft.

The conflict determination module 246 may include conflict parameters that define when a predicted/realized conflict may occur. For example, the conflict determination module 246 may include defined distance values (e.g., in meters) that define when two aircraft are in a conflict. In this example, a conflict may occur in a zone (e.g., a three dimensional space) in which the ownship comes within a defined distance value from another aircraft. In some implementations, the conflict parameters may define various levels of conflicts. For example, a plurality of different distances may be used to indicate the severity of the loss of separation. In one example, a first defined distance may be defined for a general loss of separation. Additionally, a second defined distance that is less than the first defined distance may be defined for a near mid-air collision (NMAC). Additional distances (e.g., one or more additional distances) may also be defined and associated with different levels of conflict.

In some implementations, different alerting levels may be associated with the different minimum separation distances, where more severe alerts may be used to indicate shorter predicted minimum distances between aircraft. For example, different predicted minimum separation distances may be associated with different avoidance UI, such as different GUIs, audio alerts, and/or haptics. In some implementations, the avoidance GUI may include rendering changes, such as color changes (e.g., green, yellow, and red) and/or animations (e.g., blinking) that indicate different predicted minimum separation distances. As another example, audio changes may include audio alerts that change in message and/or volume, such as a greater volume or more immediate message for shorter predicted minimum separation distances. As another example, haptic changes (e.g., vibrations) may be introduced at higher alerting levels and/or be increased in intensity.

The conflict determination module 246 determines whether there is a realized conflict and/or one or more potential future conflicts. The conflict determination module 246 may determine that a conflict is realized based on the current location of the ownship relative to other aircraft. For example, the conflict determination module 246 may determine that a conflict is realized when the ownship is less than a defined distance from another aircraft. A distance less than the defined distance may be defined as a loss of separation.

The conflict determination module 246 may determine that there is a predicted loss of separation based on the ownship and other aircraft predicted trajectories. For example, the conflict determination module 246 may determine that a conflict zone exists in an area in which the ownship trajectory intersects a predicted trajectory of another aircraft. The intersection between the ownship trajectory and another aircraft may indicate a predicted distance between the ownship and the other aircraft. A predicted conflict zone may be formed in regions where the predicted distance between the ownship and another aircraft is less than a defined threshold distance that corresponds to a loss of separation.

A predicted trajectory may include a volume of airspace for each aircraft. As such, in some implementations, an intersection between the ownship predicted trajectory volume and another aircraft predicted trajectory volume may yield a conflict zone volume that defines the conflict zone. The calculation of the predicted trajectory volumes and the definition of a conflict may define the conflict zone with respect to the conflict volume. For example, the intersection volume may equal the conflict volume. As another example, the conflict volume may be a portion (e.g., a fraction) of the intersection volume, such as when the two aircraft will likely not be in conflict within the intersection volume. In another example, the conflict volume may include an area that is larger than the intersection volume, such as when the two aircraft are likely to be in conflict in a zone outside of the intersection.

The conflict determination module 246 may determine a conflict zone data structure for each conflict. The conflict zone data structure may include data that defines the geometry of the calculated conflict zone. For example, the conflict zone data structure may define the volume of the conflict zone. In some implementations, the conflict zone data structure may include times associated with various conflict zone geometries. In some implementations, the conflict zone data structure may include probabilities associated with different portions of the volume that indicate probabilities of conflict at the location.

A resolution maneuver determination module 248 (hereinafter "maneuver determination module 248") may determine one or more resolution maneuvers for the ownship. For example, the maneuver determination module 248 may generate one or more resolution maneuvers based on the location of one or more conflict zones. In the case of a predicted conflict, the maneuver determination module 248 may generate a resolution maneuver that directs the ownship away from the predicted conflict zone. In the case of a realized conflict, the maneuver determination module 248 may generate a resolution maneuver that directs the ownship out of the realized conflict.

A resolution maneuver may indicate a velocity vector (e.g., a change in velocity vector) for the ownship that may resolve the predicted/actual conflict. For example, a resolution maneuver may indicate a change in at least one of speed (e.g., air speed), heading, and vertical speed. In some implementations, the resolution maneuver may indicate one or more ranges of velocity vectors (e.g., change in velocity vectors) for the ownship that may resolve the predicted/actual conflict. The maneuver determination module 248 may generate resolution maneuver data that specifies the resolution maneuver. Although a resolution maneuver may indicate a velocity vector for the ownship, the resolution maneuver may indicate other changes in aircraft movement that may be controlled by the pilot and/or AOC described herein, such as altitude.

The maneuver determination module 248 may determine the one or more resolution maneuvers based on a variety of factors, such as rule-based factors, constraint factors, and optimization factors. For example, the maneuver determination module 248 may determine one or more resolution maneuvers based on the locations and trajectories of the ownship and other aircraft. As another example the maneuver determination module 248 may determine the one or more resolution maneuvers based on the location of the conflict zone(s) relative to the ownship. As another example, the maneuver determination module 248 may determine the one or more resolution maneuvers based on the geometry of the conflict zone(s).

Additional example factors for determining a resolution maneuver may include: 1) time based factors, such as minimizing an amount of time to resolve a predicted/realized conflict, 2) distance based factors, such as finding the shortest deviation from the conflict and/or attempting to minimize deviation in flight for the ownship, 3) fuel economy based considerations that attempt to minimize the use of fuel, and 4) aircraft performance based factors that take into account the performance of the aircraft. In some examples, a resolution maneuver generated according to time-based factors may favor adjustments to heading and/or altitude that may quickly and efficiently avoid a conflict. Example rule based factors may include directional rules for avoiding a conflict zone, such as a rule that states that the ownship should avoid a head on conflict by heading to the right and/or rules that indicate the ownship should not enter into a greater probability of conflict during a resolution maneuver. The resolution maneuvers may also be determined based on altitude constraints (e.g., altitude intervals based on heading) and ascent/descent constraints (e.g., climb/descend based on a location relative to an airport). Calculation of the resolution maneuvers may also attempt to avoid terrain (e.g., terrain as determined from a database), specific airspaces, or crossing a runway.

An avoidance user interface (UI) module 250 may generate rendering data and other avoidance UI data based on the determined conflict zones and the resolution maneuver data. For example, the avoidance UI module 250 may generate avoidance GUI element rendering data based on the determined conflict zone(s) and the determined resolution maneuvers. Avoidance GUI element rendering data may include conflict zone rendering data and resolution maneuver rendering data that the rendering modules 252 may use to render to the conflict zones and maneuver indicators, respectively. The avoidance UI module 250 may also generate additional avoidance UI data for the additional interfaces. Additional avoidance UI data may include avoidance audio data, for example.

The rendering modules 252 receive the avoidance GUI rendering data along with other rendering data from other sources. The rendering modules 252 may render GUIs on one or more displays based on the received avoidance GUI rendering data and other rendering data. The rendering modules 252 may render the avoidance GUI elements according to the type of GUI/display. For example, if the conflict zone(s) are three-dimensional data structures, the avoidance UI module 250 and rendering modules 252 may generate two dimensional or three dimensional graphical representations of the conflict zones according to the display perspective (e.g., FPV, third person view, side view, top view, etc.).

The rendered maneuver indicator may vary, depending on the type of GUI and the information indicated by the rendered maneuver indicator. For example, the rendered maneuver indicator may graphically indicate one or more of: 1) a recommended velocity vector (e.g., a change in velocity vector) for the ownship in the avoidance GUI, 2) a change in flight path angle, 3) a change in vertical speed, 4) a change in airspeed, 5) a change in heading, and 6) a change in ground track. In some examples, with respect to the primary flight display of FIGS. 6A-6G, the rendered maneuver indicator may indicate a recommended direction or range of direction(s) for the rendered flight path vector. The flight path vector may also be referred to as a "velocity vector" in some cases. In the side view of FIG. 3G, the rendered maneuver indicator may illustrate a recommended change in vertical speed, which may also be referred to as a climb rate. The avoidance system 200 may be configured to render maneuvers graphically and also indicate maneuvers using other UI (e.g., audio and haptics) in a variety of ways, depending on the types of UI available on the ownship. As such, the avoidance system 200 may display maneuver indicators in other manners than those illustrated herein.

In some implementations, the avoidance UI module 250 may generate avoidance audio data to notify the pilot of a predicted/actual conflict. Avoidance audio data may include announcements, warnings, instructions, and other audio. For example, the avoidance UI module 250 may generate sounds (e.g., sounds/voices) that notify the pilot of a predicted/actual conflict. In one example, the avoidance UI module 250 may generate notification sounds that notify the pilot of a predicted conflict when no immediate action is required. In a specific example, the avoidance UI module may generate a notification that does not require immediate action, but notifies the pilot that they should be prepared for action (e.g., a notification of unlikely potential conflicts), such as "Traffic 11 O'clock, 1,000 ft below/above/climbing/descending." As another example, the avoidance UI module 250 may generate an alert sound when loss of separation is predicted. The avoidance UI module 250 may also provide maneuver instructions, such as "Traffic, Turn right/left" or "Maintain altitude/climb/descent." As another example, the avoidance UI module 250 may generate an alert sound in response to a realized conflict, such as "Traffic, recover!," "Turn right/left," and/or "Maintain altitude/climb/descent."

The pilot may interact with the pilot controls 222 to perform the recommended resolution maneuver. For example, the pilot may interact with the yoke, stick, and/or power lever ("throttle") to perform the recommended resolution maneuver. Interaction with the pilot controls may vary, depending on the recommended resolution maneuver. For example, the pilot may interact with the pilot controls to change one or more of the heading, altitude, vertical speed, and airspeed of the ownship according to the recommended resolution maneuver. In a specific example, by interacting with the pilot controls, the pilot may change the velocity vector of the aircraft according to the recommended maneuver indicator. In response to pilot input and a change in the velocity vector of the ownship, the avoidance system may update the trajectory predictions, rendering data, and avoidance GUIs accordingly. In some implementations, the pilot may interact with other interfaces to perform the recommended resolution maneuver. For example, the pilot may interact with dedicated buttons and/or a touchscreen to perform the resolution maneuver. In one specific example, the pilot may interact with a button/touchscreen to select/accept one or more recommended resolution maneuvers. In another specific example, the pilot may interact with a button/touchscreen to command the autopilot to automatically perform the recommended resolution maneuver.

The rendered zones in the avoidance GUI may represent a portion of the environment for which the avoidance system performs trajectory predictions and conflict detection. As such, the avoidance system 200 may predict trajectories and potential conflicts for other aircraft that are not rendered on the avoidance GUI. Additionally, the avoidance system 200 may monitor other factors that are not currently rendered on the avoidance GUI, such as weather and terrain. The avoidance system 200 may take into account the offscreen trajectories, predicted conflicts, and terrain when calculating the resolution maneuvers.

FIG. 2E is a method that describes operation of the avoidance system illustrated in FIGS. 2C-2D. In block 260, the data processing module 242 acquires data from the sensors 204, communication system(s) 206, and/or navigation system(s) 208. In block 262, the trajectory determination module 244 determines the ownship trajectory based on the state of the ownship, an ownship flight plan, and/or pilot inputs. In block 264, the trajectory determination module 244 determines trajectories of N other aircraft based on the state of the other aircraft and/or flight plans for the other aircraft.

In block 266, the conflict determination module 246 determines one or more conflict zones based on the predicted trajectories. If a conflict zone is not detected in block 266, the method continues in block 260 according to block 268. If one or more predicted/realized conflict zones are detected in block 266, the maneuver determination module 248 determines a resolution maneuver in block 270. In block 272, the avoidance UI module 250 generates conflict zone rendering data, resolution maneuver rendering data, and additional UI data. In block 274, the rendering modules 252 render one or more avoidance GUIs based on the rendering data. In block 276, the additional interfaces generate additional avoidance UI. Although the avoidance system 200 may render one or more avoidance GUIs and/or control other avoidance interfaces, in some implementations, the avoidance system 200 may generate resolution maneuvers that are automatically executed by the aircraft (e.g., an autopilot). Automatically executed resolution maneuvers may be performed with or without additional GUI input/output.

FIGS. 2F-2G illustrate alternative implementations of the avoidance system 200 in the ownship 100 and the AOC 108, respectively. FIG. 2F illustrates an example implementation of the avoidance system 200-2 as a stand-alone system in the ownship 100. FIG. 2G illustrates an example AOC 108 that includes components of the avoidance system 200-3. In this example, a remote pilot may control the ownship 100 from the AOC 108 using AOC pilot I/O 280. The remote pilot may view the avoidance GUI elements on one or more displays 282 in the AOC 108. The AOC includes an AOC-ownship communication system 284 that communicates with the ownship 100. For example, the AOC 108 may communicate with the ownship 100 via a data connection and/or via a radio relay. The AOC 108 may receive data acquired by the ownship 100 (e.g., sensor data, navigation data, comm. data, and other data). The AOC 108 may monitor the ownship 100 and/or control operation of the ownship 100. The AOC 108 may send commands (e.g., pilot/autopilot commands) to the ownship 100 that control the ownship 100. The AOC 108 includes other AOC systems, devices, and modules 284 that provide the functionality described herein, along with additional functionality associated with the AOC 108. For example, the other AOC systems, devices, and modules 284 may provide path planning functionality and other flight management system functionality for the ownship 100.

FIGS. 3A-6G illustrate example GUI interfaces that include avoidance GUI elements along with other GUI elements. FIGS. 3A-3J illustrate example rendered zones 300-1, 300-2, . . . , 300-11 (generally referred to as "rendered zones 300") that are rendered from different perspectives on different types of displays. FIGS. 4A-4C illustrate example avoidance GUIs that notify the pilot of a potential conflict. FIGS. 5A-5D illustrate example avoidance GUIs that include multiple rendered zones. FIGS. 6A-6G illustrate example maneuver indicators 600.

FIGS. 3A-3E illustrate avoidance GUIs that include a single rendered zone 300 from a first person point of view. The GUIs of FIGS. 3A-3E also include additional GUI elements, such as a horizon GUI element 302, a heading GUI element 304, an aircraft nose direction GUI element 306, and a flight path vector GUI element 308 including a circle portion and two wing portions, where the wing portions may indicate the ownship roll. The example GUIs illustrated in FIGS. 3A-3E may be representative of a primary flight display. The GUI elements illustrated in FIGS. 3A-3E are also included in additional figures.

The horizon GUI element 302 splits the view into the ground/sky below/above the line. The heading GUI element 304 may indicate the current/future direction of the aircraft, depending on the aircraft nose direction 306 and location of the flight path vector 308. The aircraft nose direction GUI element 306 indicates the direction in which the nose of the ownship 100 is currently facing (e.g., the actual heading of the ownship). The flight path vector 308 indicates the velocity vector of the aircraft.

The rendered zone 300 depicts a region in which placement of the flight path vector 308 may lead to a conflict. Put another way, placement of the flight path vector 308 in contact with (e.g., overlapping) the rendered zone 300 may cause the ownship 100 to head into a conflict zone (e.g., see FIGS. 4A-4C). Accordingly, if the flight path vector 308 is placed in contact with the rendered zone 300, the ownship 100 may be in a potential conflict with another aircraft.

In order to simplify the GUI interfaces, the GUIs illustrated herein may include a limited number of GUI elements. For example, the GUIS of FIGS. 3A-3E include a limited number of GUI elements relative to an implementation in an aircraft. For example, a PFD may include additional GUI elements not included in FIGS. 3A-3E.

The GUIs illustrated herein may be representative of an animated GUI and/or video interface in which the GUIs are updated over time. As such, the illustrated GUIs are example GUIs that may represent a display at a moment in time. For example, the rendered zones 300, maneuver indicators 600, and other GUI elements may move on the display over time as conditions change. Additionally, some GUI elements may appear/disappear over time as conditions change. For example, a rendered zone 300 may appear/disappear as intruders move in and out of conflict with the ownship. Additionally, the size and shape of the rendered zones 300 may change based on a change in size of the conflict zone due to movement of the ownship and/or the intruder.

In FIGS. 3A-3E, the location of the flight path vector 308 indicates that the ownship heading is in a direction that will avoid the rendered zone 300. As such, the avoidance GUIs in FIGS. 3A-3E indicate that there is not a predicted conflict with other aircraft. FIGS. 3A-3E illustrate different renderings of a single rendered zone in which there is no predicted conflict.

Figure 3A:
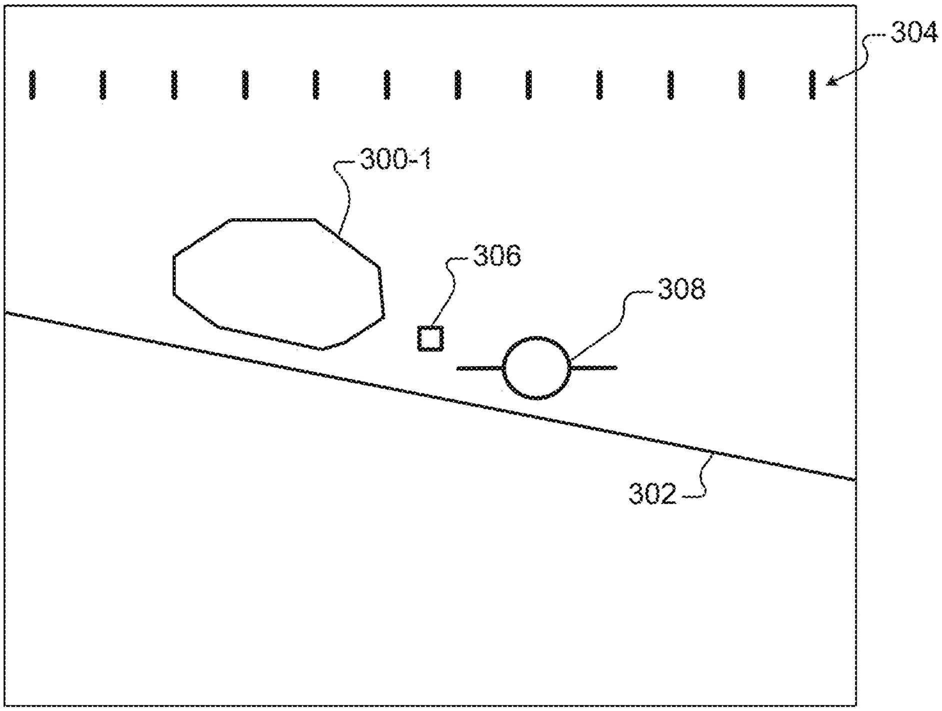
FIGS. 3A-3J illustrate example avoidance graphical user interfaces (GUIs) that include rendered conflict zones.
Figure 3B:
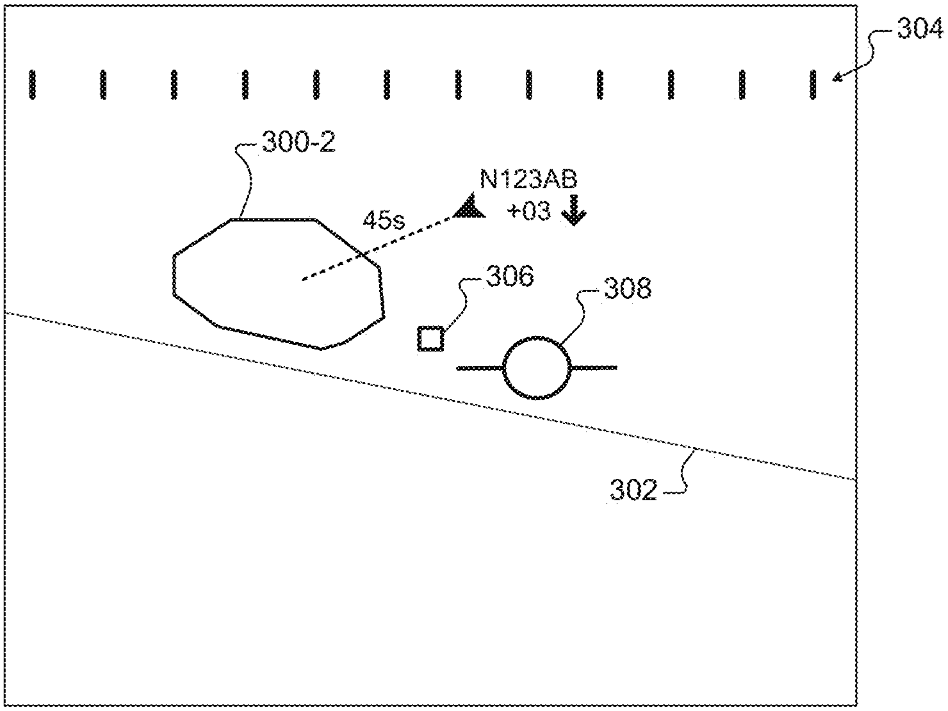
Figure 3C:
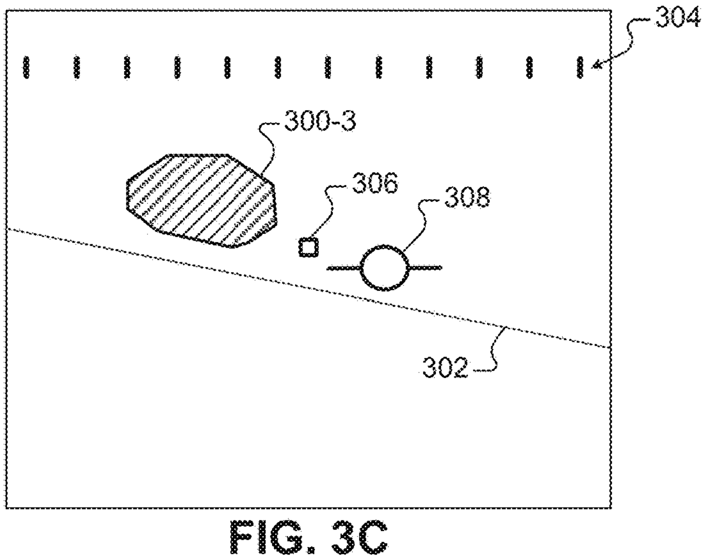

In FIGS. 3A-3B, the rendered zones 300-1, 300-2 are illustrated as solid lines, although the GUI may render the line in another manner, such as an opaque line or other line pattern (e.g., a broken line). The rendered zone (e.g., area) is included within the rendered zone line. In FIGS. 3A-3B, the rendered zones 300-1, 300-2 include empty space. In FIG. 3C, the rendered zone 300-3 is rendered as a shaded region (e.g., represented by a shading pattern). The shaded rendered zone 300-3 may be rendered in a variety of ways. For example, the rendered zone 300-3 may be made opaque or partially transparent. The rendered zone may also be colored.

Figure 3D:
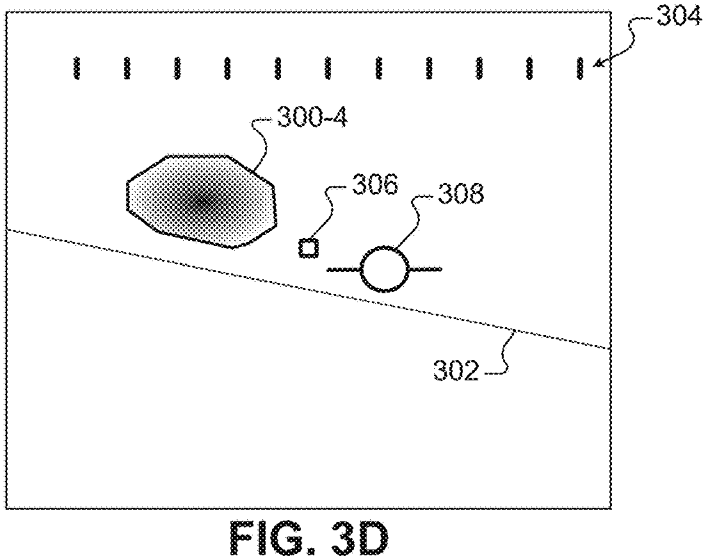
Figure 3E:
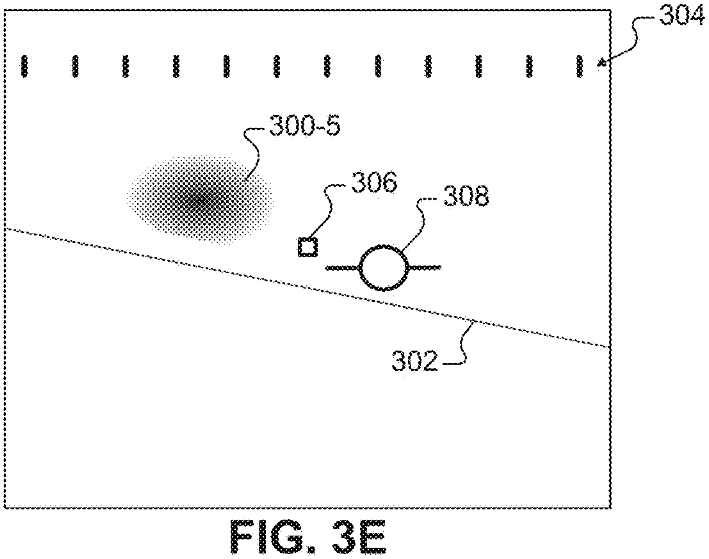

FIGS. 3D-3E illustrate rendered zones 300-4, 300-5 that are rendered using gradient shading, where the shading is darkest in the center and lighter towards the border of the rendered zone. In FIG. 3D, the border of the rendered zone 300-4 is rendered as a line. In FIG. 3E, the border of the rendered zone 300-5 is defined by the edges of the gradient. In some implementations, the gradient shading may indicate the likelihood of loss of separation within the rendered zone. For example, the dark center may indicate a region where loss of separation is most likely to occur. In this example, the loss of separation may be less likely to occur in the lighter shaded region. In some implementations, other GUI renderings may be used to indicate likely loss of separation, such as color gradients from red to green, where red/green may indicate likely/unlikely loss of separation. Although the gradients illustrated in FIGS. 3D-3E represent a rendered zone including a darker center region with lighter shaded outer region, rendered zones may have different renderings when the likelihood of loss of separation is different. For example, darker regions may be arranged nearer to the border of the rendered zone, with lighter regions near the center, depending on the likelihood of loss of separation caused by the intruder.

In some implementations, such as in FIG. 3B, the avoidance GUI may illustrate intruder aircraft information associated with a rendered zone. Example intruder aircraft information may include a graphical representation of the intruder trajectory. For example, FIG. 3B illustrates the intruder trajectory using an arrow and broken line. Additional example intruder aircraft information may include an available intruder tail number (e.g., N123AB), an aircraft type, an approximate time of arrival at the conflict zone (e.g., 45 seconds in FIG. 3B), a relative altitude (e.g., +300 feet), and an arrow that indicates whether the intruder is climbing or descending (e.g., a down arrow in FIG. 3B indicates descent).

In some implementations, the avoidance system 200 may render the rendered zone 300 in a manner that conveys information related to detection of the conflict zone. For example, the rendering (e.g., shape/line type) may depend on the type and number of sensors used to detect an intruder. In one case, single sensor detection of an intruder may be rendered as a contour, whereas multiple sensor detection of the intruder may be rendered as a filled region (e.g., a gradient). Additional example intruder aircraft information may include the number and/or type of sensor(s) used to detect the intruder (e.g., ADS-B, radar, camera in FIG. 3H).

Figure 3F:
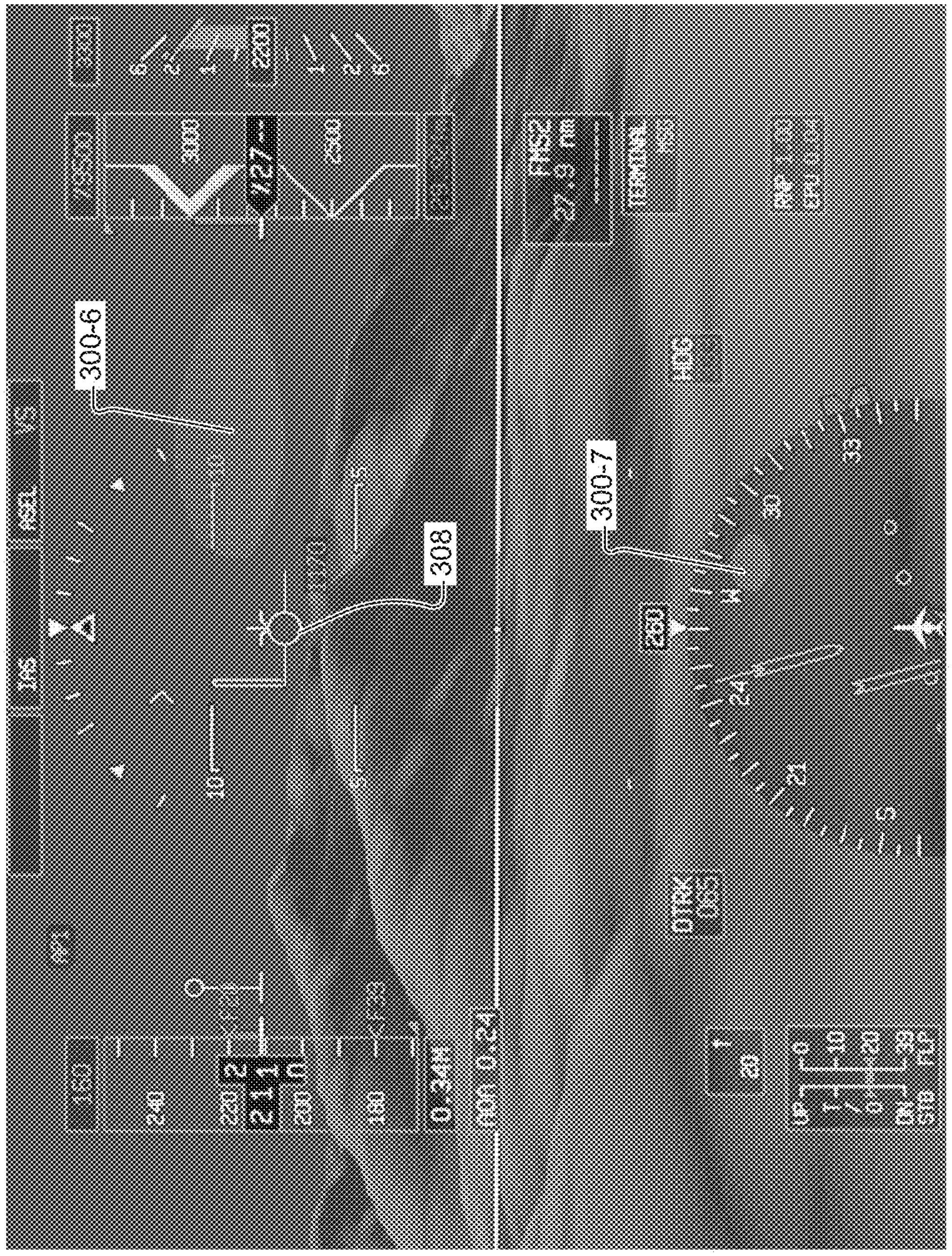

FIG. 3F illustrates two GUIs showing different viewpoint renderings of the same conflict zone. The top GUI shows a first-person view of the conflict zone. The bottom GUI shows a top-down view of the same conflict zone. The GUIs of FIG. 3F include three-dimensional graphical renderings of terrain instead of a horizon line, as illustrated in FIGS. 3A-3E. The three-dimensional terrain renderings may be produced using databases and/or other real-time data.

The rendered zone 300-7 illustrated in the top-down view may be rendered in a similar manner as described with respect to FIGS. 3A-3E. For example, the top-down rendered zone 300-7 may include a border, shading, and/or coloring. In some implementations, the rendered zone may include information (e.g., color/shading/text) that indicates a depth of the conflict zone.

Figure 3G:
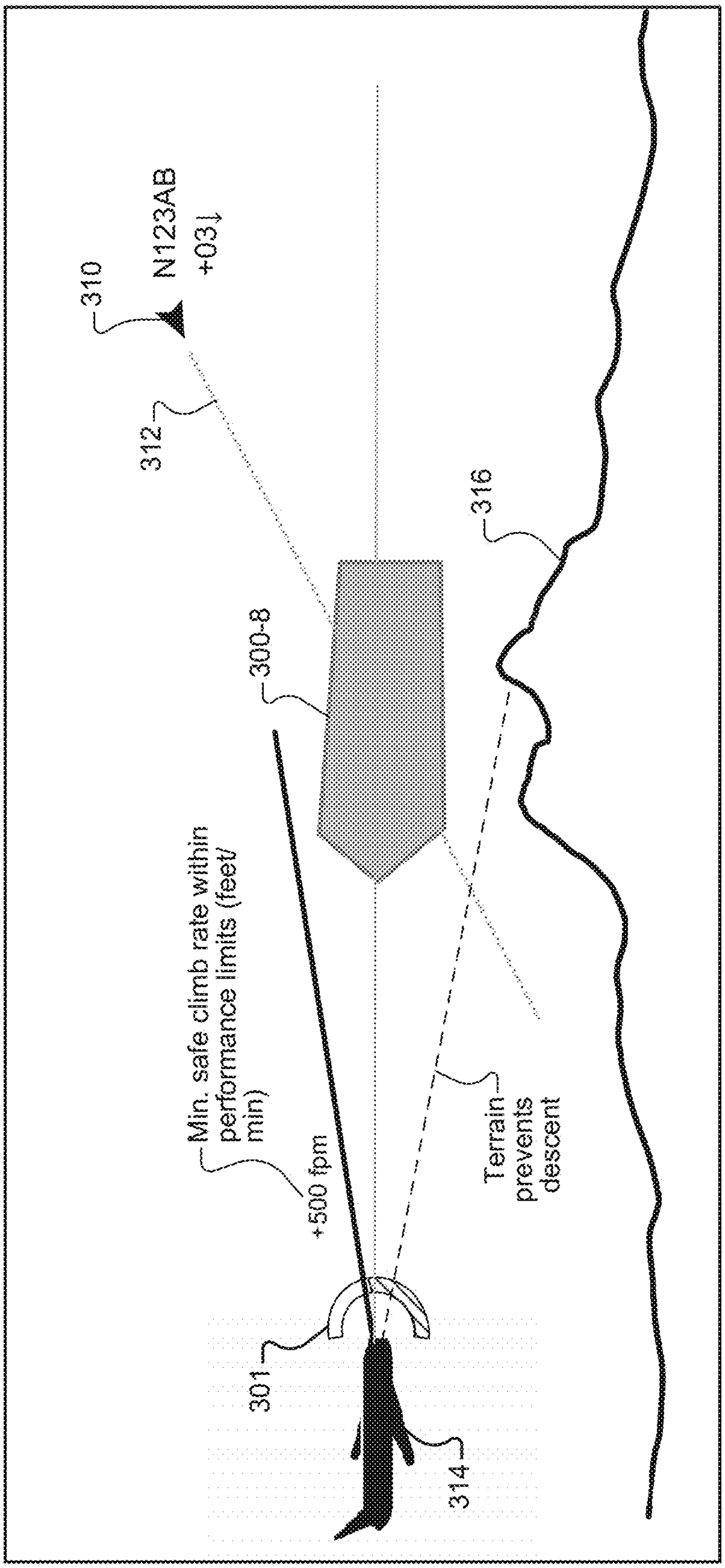

FIG. 3G illustrates an example side view avoidance GUI. Note that the side view of the rendered zone 300-8 may provide details regarding the shape of the conflict zone over hidden terrain 316. The GUI of FIG. 3G also includes intruder data for an intruder 310 (e.g., similar to FIG. 3B) and an intruder predicted trajectory 312. In FIG. 3G, the ownship 314 is heading toward the conflict zone. A rendered maneuver indicator 301 indicates a resolution maneuver that the pilot may perform to avoid the conflict zone. Specifically, the unshaded portion of the maneuver indicator indicates a climbing maneuver that the pilot may make in order to avoid the conflict zone. In the specific example of FIG. 3G, the minimum safe climb rate to be made within performance limits may be 500 feet per minute. The shaded portion of the maneuver indicator indicates a range of maneuvers that are not recommended for avoiding conflict.

Figure 3H:
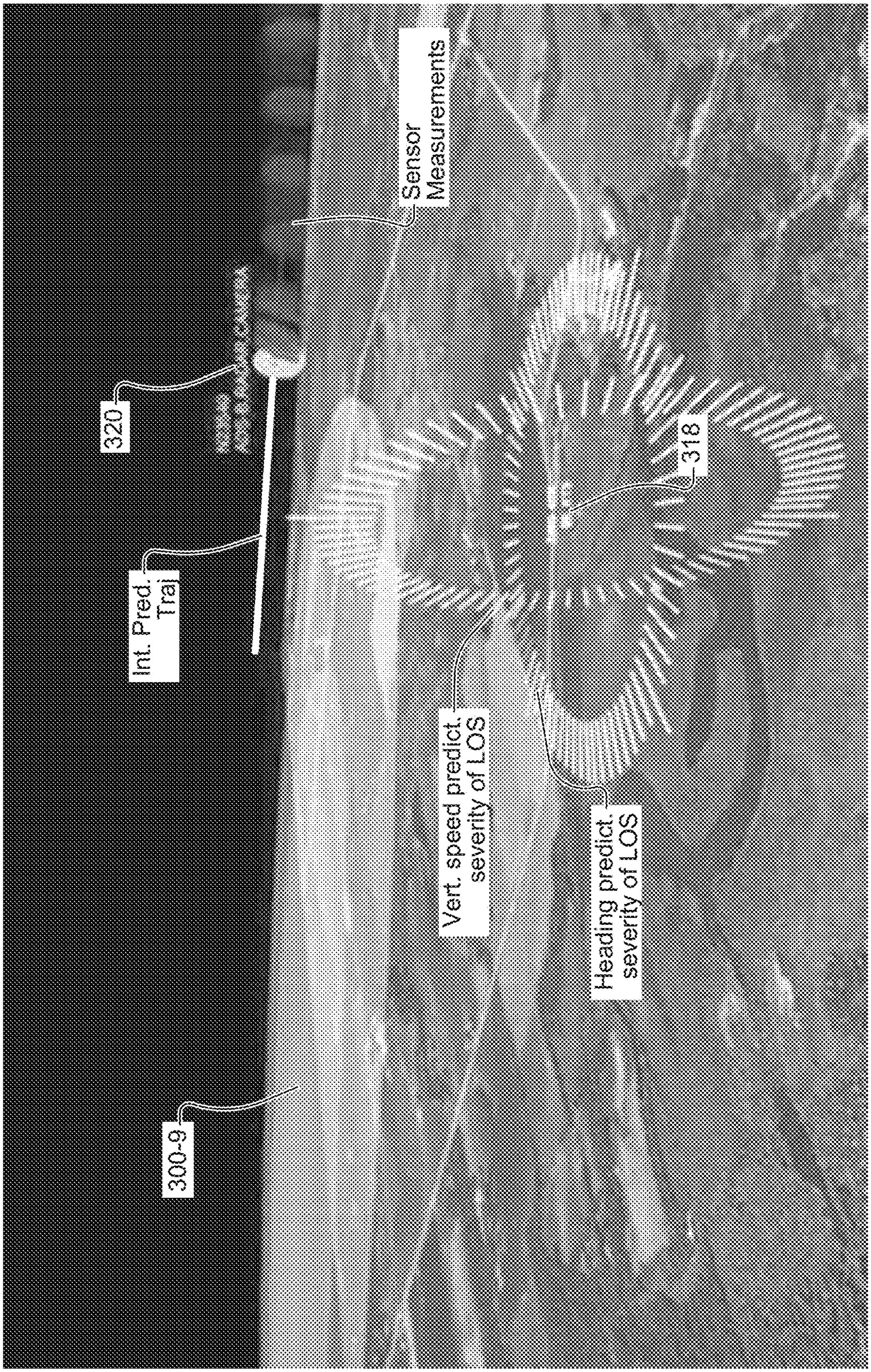

FIG. 3H illustrates an example avoidance GUI in a third person point of view. The avoidance GUI illustrates the ownship 318 and an intruder 320 heading toward the upper left portion of the GUI. The ownship and intruder trajectories are in potential conflict in a rendered zone 300-9 (e.g., a 2D rendered zone). The rendered zone 300-9 is illustrated in FIG. 3H as including a gradient that may indicate the likelihood of loss of separation for different locations. Although the rendered zone 300-9 is illustrated as a gradient (e.g., a color gradient), the rendered zone may be rendered in a similar manner as described with respect to FIGS. 3A-3E. For example, the rendered zone may include a border, shading, and/or coloring. In some implementations, the rendered zone may include information (e.g., color/shading/text) that indicates other data describing the rendered zone.

The GUI in FIG. 3H includes a third-person view of the environment (e.g., ground renderings). The GUI also includes intruder data. For example, the intruder data may include a predicted trajectory, an aircraft identifier, and data that indicates the sensor(s) used to identify the intruder. For example, the GUI indicates that the intruder has been identified by ADS-B, Radar, and one or more cameras. The GUI also indicates sensor measurements that are depicted as ellipsoids. The ellipsoids may represent the uncertainty in the measurements from the sensors. For example, the intruder may be more likely to be at the center of the ellipsoid, but has a probability (e.g., 95%) of being anywhere inside the ellipsoid.

Two maneuver indicator rings are rendered around the ownship. The horizontal and vertical rings may indicate ground tracks and vertical speeds, respectively. The shading/color of the ticks on the rings (e.g., near the portion of the rings in the ownship trajectory) indicate the severity of the loss of separation (LOS) should the ownship modify its flight path vector to one of those ground tracks or vertical speeds.

Figure 3I:

FIG. 3I illustrates an example monochromatic HUD that includes a rendered zone 300-10 and a flight path vector 308, as described with respect to FIGS. 3A-3E. The rendered zone 300-10 illustrated in the HUD may be rendered in a similar manner as described with respect to FIGS. 3A-3E. For example, the HUD rendered zone 300-10 may include a border, shading, and/or coloring (e.g., in a multicolor HUD).

Figure 3J:
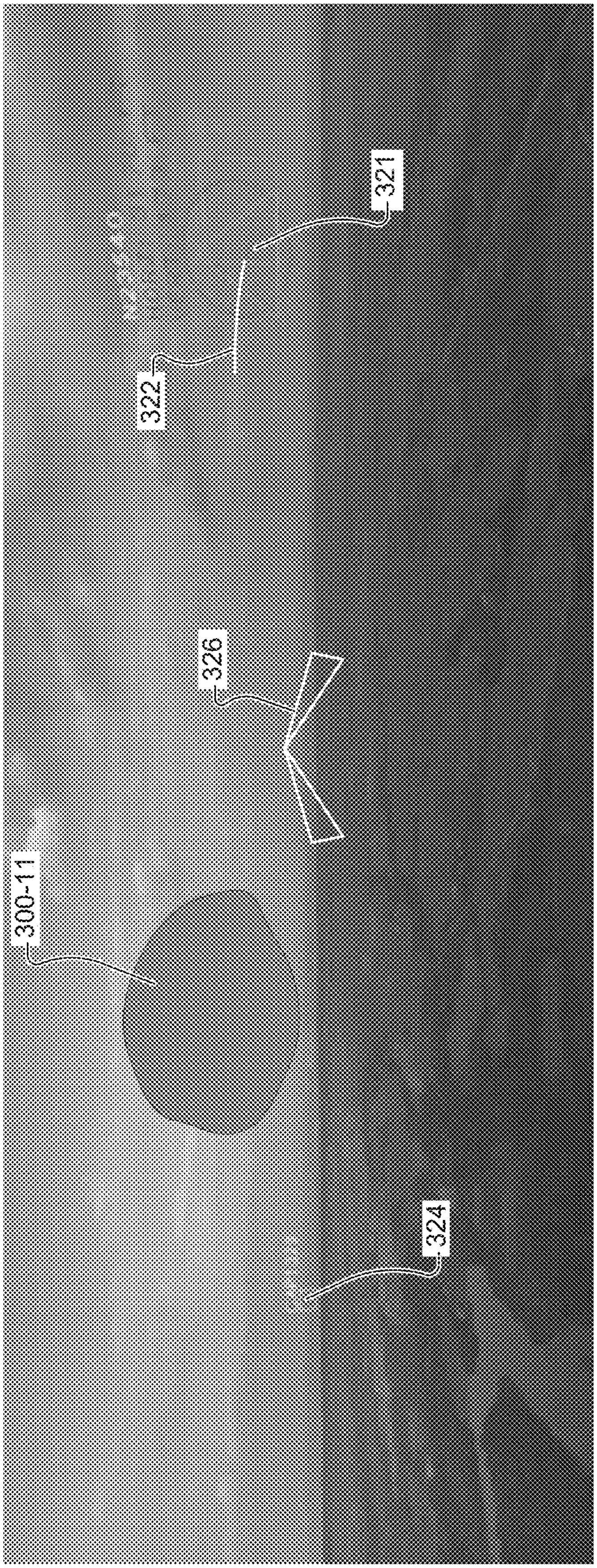

FIG. 3J illustrates an example rendered zone 300-11 in a live video image GUI. In the GUI of FIG. 3J, the rendered zone 300-11 is overlaid onto a live video feed, such as a video feed generated based on cameras included on the ownship. The GUI of FIG. 3J also includes intruder information for an intruder 321, such as an intruder trajectory 322 and shapes (e.g., a triangle, squares, and a circle) that indicate which sensors detect the other aircraft. The GUI also includes another aircraft 324 (e.g., ID CAP1329) that is not an intruder. The rendered zone 300-11 of FIG. 3J may also be rendered in a similar manner as illustrated and described with respect to FIGS. 3A-3I. The GUI of FIG. 3J also includes a platform attitude GUI element 326.

FIGS. 4A-4C illustrate avoidance GUIs in which the ownship is on a trajectory for a predicted conflict. In FIGS. 4A-4C, the predicted conflicts are indicated by the overlap between the flight path vectors 400-1, 400-2, 400-3 and the rendered zones 402-1, 402-2, 402-3. For example, the circle portion and/or the wing portion of the flight path vectors 400 overlap with a portion of the rendered zones 402 in FIGS. 4A-4C.

The predicted conflict may also be represented in other manners for GUIs that include a flight path vector or other GUI elements. For example, the predicted conflict may be represented by rendering the conflict zone in a different manner when a conflict is predicted. In FIG. 4B, the rendered zone 402-2 is shaded to indicate the predicted conflict. Although shading of the rendered zone is illustrated, other renderings of the rendered zone may indicate a predicted conflict, such as coloring, gradients, different line types (e.g., broken, solid), and/or blinking.

In some implementations, a rendered zone may include one or more renderings (e.g., effects, colors, etc.) that indicate a level of risk. For example, a transparent rendered zone or a white color may indicate no risk factor. In this example, a yellow/amber color may indicate a medium level of risk. Furthermore, in this example, a red color may indicate that a maneuver is required. Additionally, in this example, a blinking red color may indicate that a maneuver is immediately required.

FIG. 4C illustrates an example in which the flight path vector 400-3 is rendered in a manner that indicates a predicted conflict. For example, in FIG. 4C, the flight path vector 400-3 is shaded to indicate a predicted conflict. Although the flight path vector is shaded, other renderings of the flight path vector may be used to indicate a predicted conflict. For example, the flight path vector may be rendered using different types of lines (e.g., solid/broken), different shadings, different colorings, and/or different effects.

In some implementations, the avoidance system 200 may use additional UI to indicate a potential conflict. For example, the avoidance system 200 may use audio cues to indicate a potential conflict. As another example, the avoidance system may use visual cues, such as blinking lights to indicate a potential conflict.

Figure 5A:
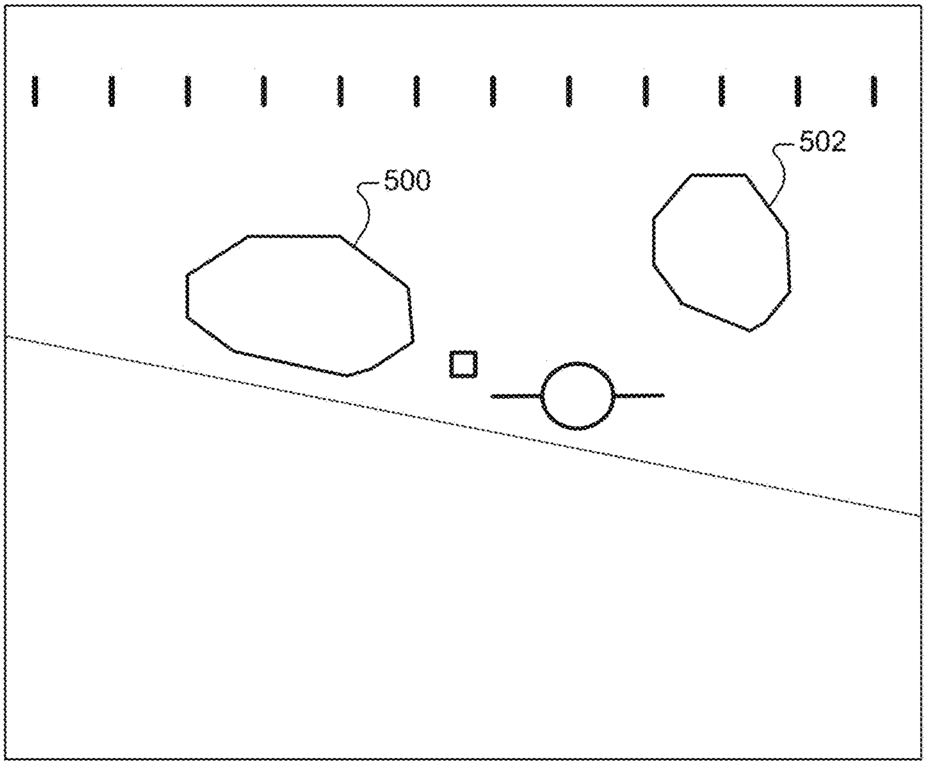
FIGS. 5A-5D illustrate example avoidance GUIs that include rendered conflict zones generated in response to multiple intruders.
Figure 5B:
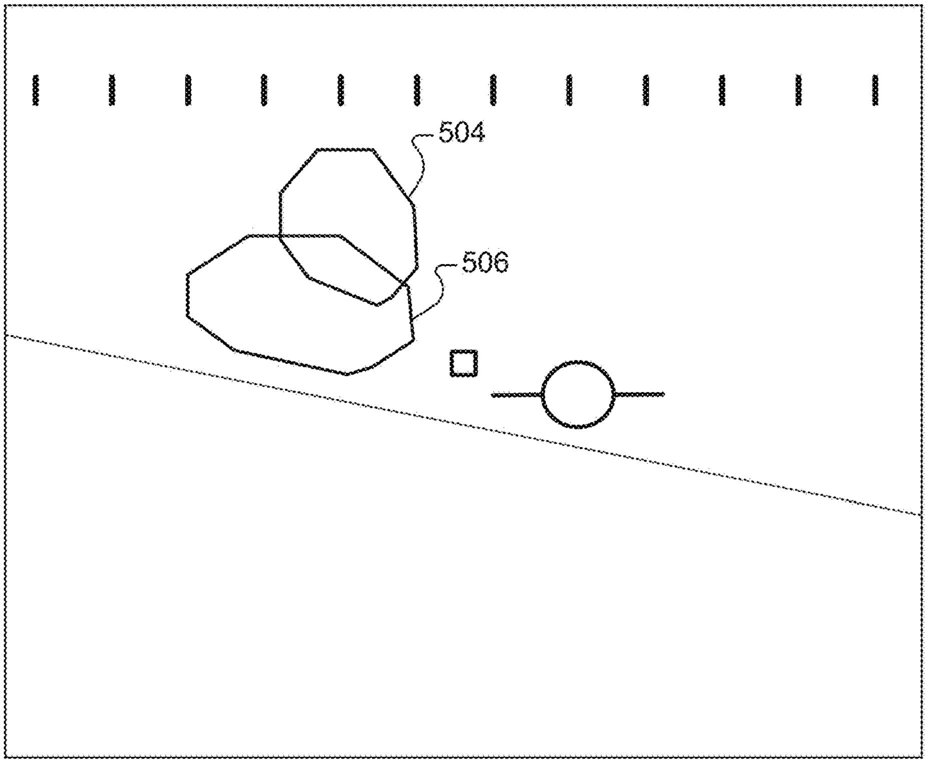

FIGS. 5A-5D illustrate example avoidance GUIs that include multiple rendered zones. FIG. 5A illustrates two separate rendered zones 500, 502, each of which may be rendered as described herein. Each rendered zone may be associated with one or more intruders. FIG. 5B illustrates two overlapping rendered zones 504, 506. In FIG. 5B, the conflict zones (e.g., conflict volumes) generated by the intruders may overlap with one another. The borders of each conflict zone may be rendered in order to illustrate that two conflict zones are overlapping. In some implementations, the rendered zone(s) 504, 506 may have different colors to indicate different levels of alert/urgency.

Figure 5C:
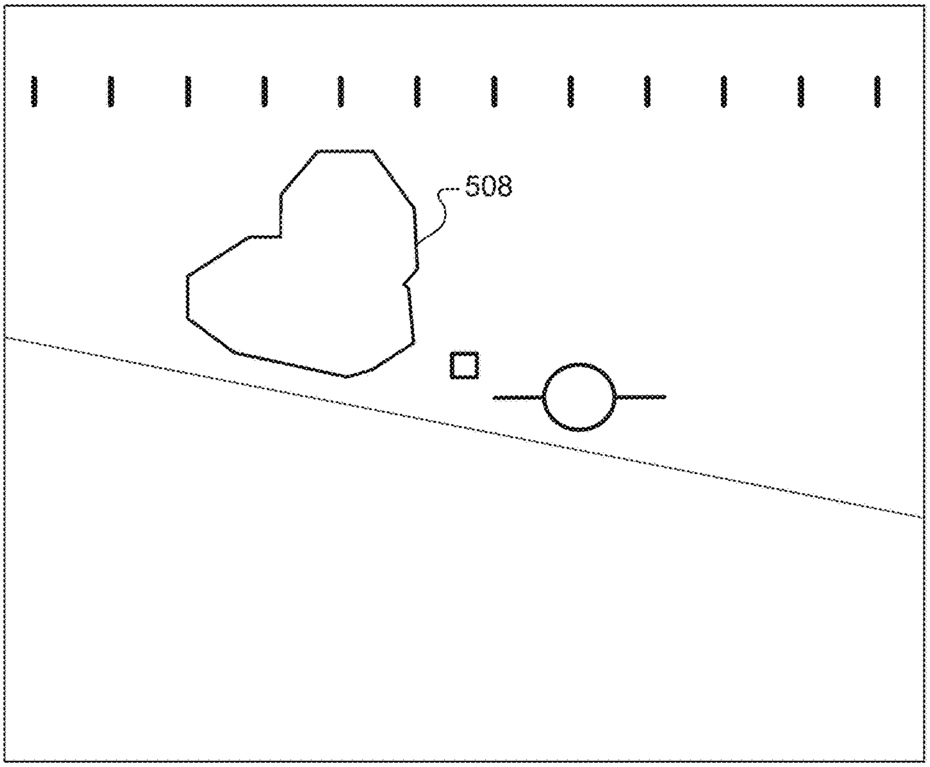

FIG. 5C illustrates another rendering of two overlapping conflict zones (e.g., conflict volumes) in a manner that is different than the GUI of FIG. 5B. In FIG. 5C, the multiple conflict zones are rendered as a single rendered zone 508 that is a combination of the multiple conflict zones. For example, the multiple conflict zones are illustrated as a single rendered zone 508 with a single defined border. Blending and/or transparency of the rendered zone(s) may also be used to indicate overlap of the two or more zones.

Figure 5D:
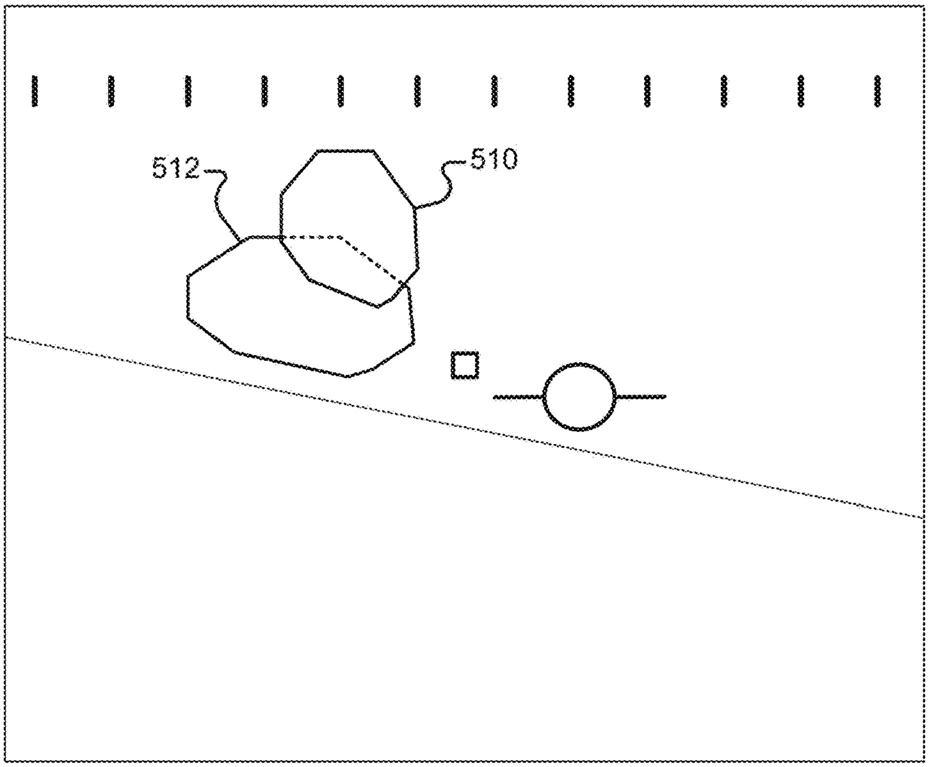

FIG. 5D illustrates an example GUI including two rendered zones 510, 512, where one rendered zone 512 is located behind another rendered zone 510 from the perspective of the ownship. In FIG. 5D, the bottom portion of the near rendered zone 510 obscures the top portion of the far rendered zone 512. The avoidance GUI of FIG. 5D represents the obscured portion of the far rendered zone 512 as a broken line within the border of the near rendered zone 510. An obscured portion of a rendered zone may be rendered in other manners, such as by masking the far rendered zone with a solid (e.g., white/colored) or shaded near rendered zone.

In some implementations, the avoidance GUI may use colors and/or patterns to indicate a level of urgency (e.g., a time to conflict) associated with a rendered zone. For example, rendered zones may be rendered using different patterns and colors that indicate different times to conflict. In a specific example, red/yellow/green colors in rendered zones may indicate severe/intermediate/minor levels of urgency. In some implementations, an entire rendered zone may be rendered using a single pattern/color. In other implementations, portions of rendered zones may be rendered using different patterns/colors (e.g., as a gradient) to indicate levels of urgency associated with the different portions of the conflict zone volume. The renderings may change over time as the levels of urgency associated with the rendered zones change. In a monochromatic avoidance GUI, urgency associated with conflict zones may be rendered using different lines, such as solid lines (e.g., urgent) and/or striped/patterned/translucent lines (e.g., less urgent).

FIGS. 6A-6G illustrate example maneuver indicators 600-1, 600-2, . . . , and 600-7 (generally referred to as "maneuver indicators 600"). FIGS. 6A-6F illustrate maneuver indicators 600 that indicate one or more maneuvers that the ownship may perform to prevent entering the conflict zone. FIG. 6G illustrates an example maneuver indicator 600-7 that indicates one or more maneuvers that the ownship may perform to regain separation from an intruder during a realized conflict.

Figure 6A:
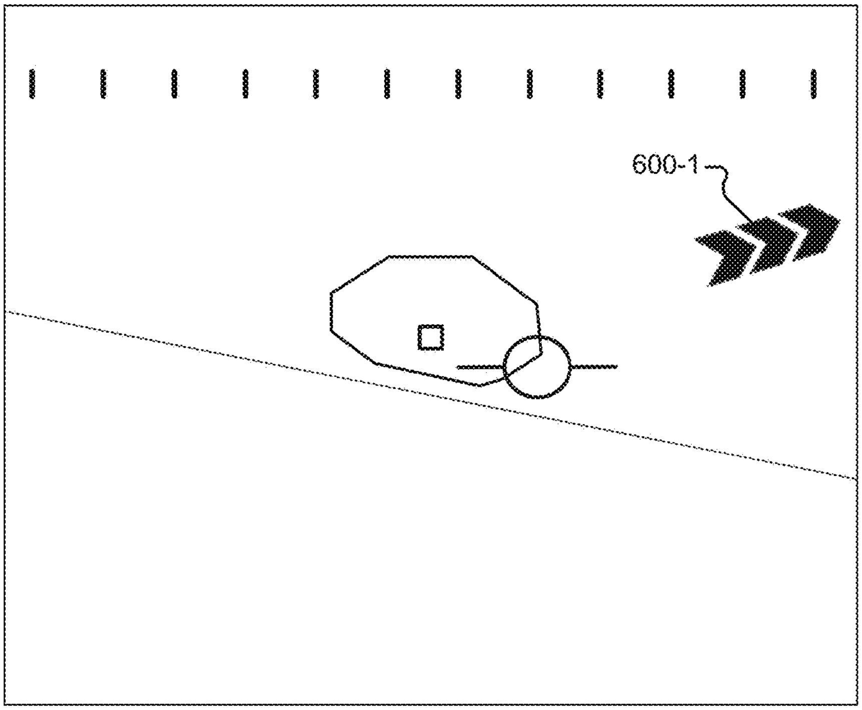
FIGS. 6A-6G illustrate example avoidance GUIs including maneuver indicators.

FIG. 6A illustrates an example maneuver indicator 600-1 that indicates a direction for the ownship pilot to take in order to avoid the predicted conflict. For example, the maneuver indicator 600-1 may indicate a change in velocity vector for the ownship that may resolve the predicted conflict. The example maneuver indicator 600-1 is a series of arrows that indicate a direction. In some implementations, the arrows may be colored, blink, and/or be animated (e.g., rolling).

Figure 6B:
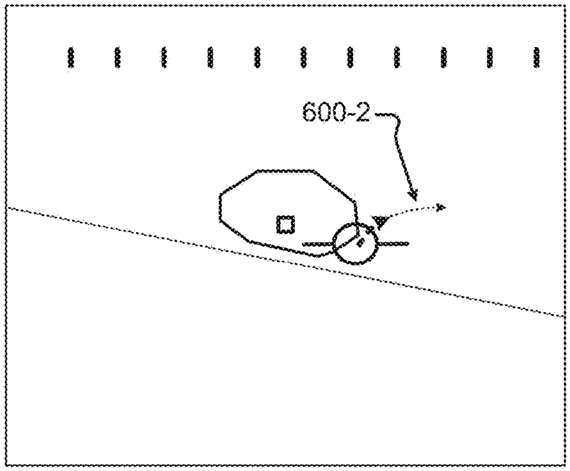

FIG. 6B illustrates another example maneuver indicator 600-2 that indicates a direction for the ownship to avoid the conflict zone. The maneuver indicator 600-2 of FIG. 6B may indicate a more specific change in velocity vector for the ownship that may resolve the predicted conflict. In some implementations, the maneuver indicator 600-2 may be colored, blink, and/or be animated. In FIG. 6B, a pilot may use a flight yoke to change the heading of the ownship (and the associated velocity vector) according to the maneuver indicator 600-2. For example, the pilot may pull to climb, push to descend, and turn clockwise/counterclockwise to bank right/left. Using a flight stick, the pilot may tilt the stick left/right to bank the ownship. As described herein, in some implementations, the avoidance system 200 and flight control system 210 may include automation for controlling the ownship. For example, if the pilot fails to steer the ownship when the ownship is nearing/entering a conflict zone, the autopilot may automatically steer the ownship away from the potential/realized conflict (e.g., according to the maneuver data).

Figure 6C:
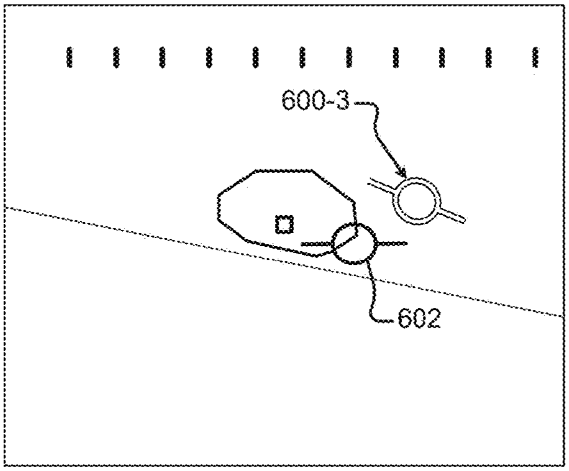

FIG. 6C illustrates an example maneuver indicator 600-3 that may be referred to as a "flight director." The maneuver indicator 600-3 in FIG. 6C indicates where the pilot should move and orient the flight path vector to avoid the conflict zone. For example, in FIG. 6C, the maneuver indicator 600-3 may indicate that a desired orientation for the flight path vector 602 is one that aligns with (e.g., fits within) the maneuver indicator 600-3. Specifically, in FIG. 6C, the pilot should move the flight path vector 602 to the right and bank the flight path vector to the right.

Figure 6D:
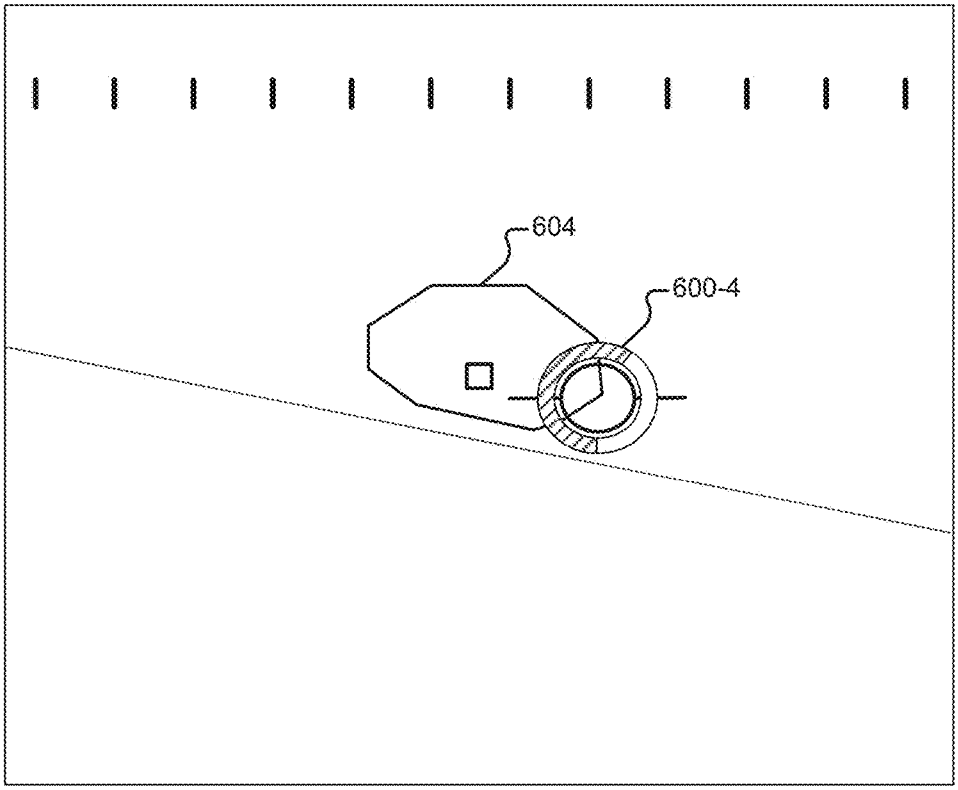
Figure 6E:
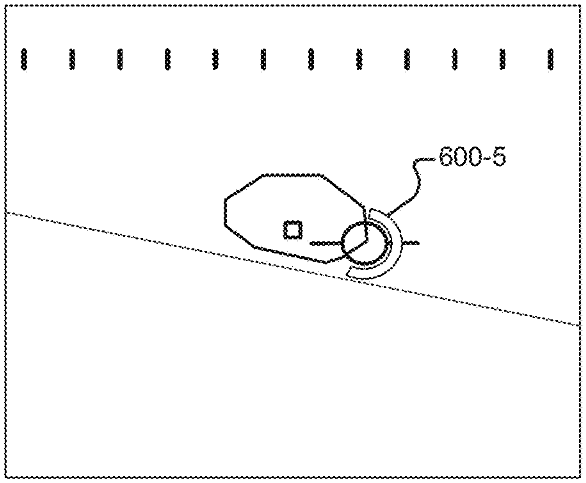
Figure 6F:
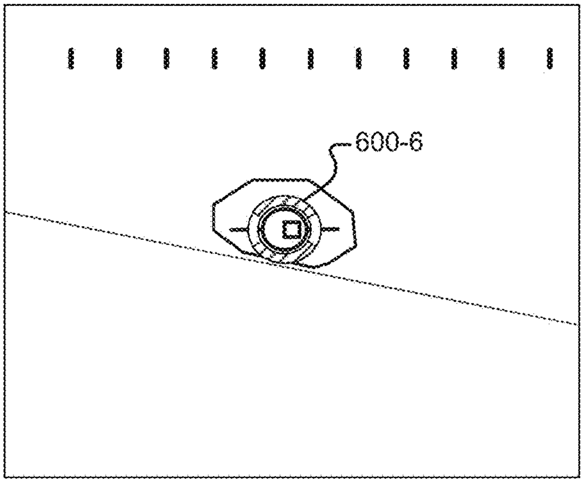
Figure 6G:
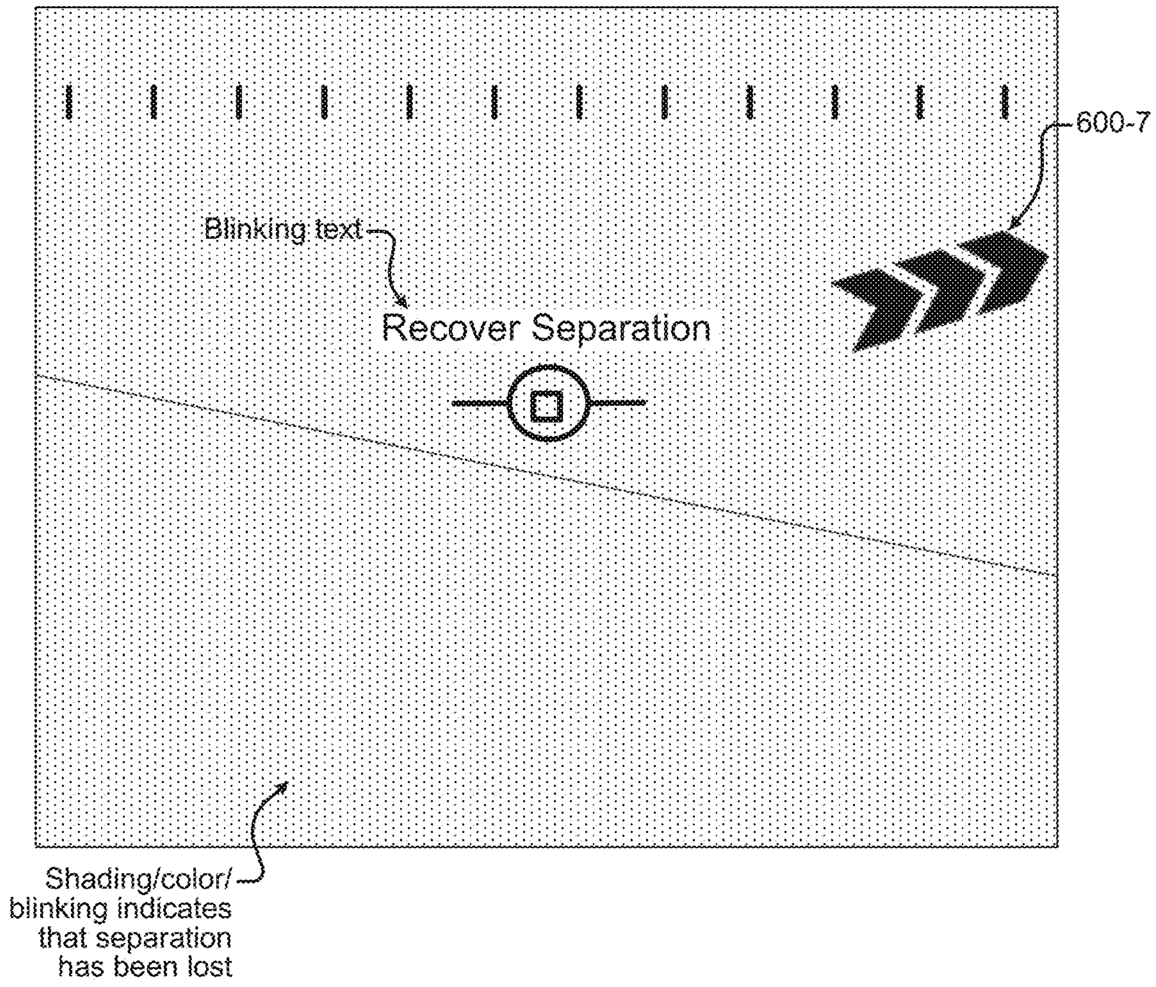

FIGS. 6D-6F illustrate example maneuver indicators 600-4, 600-5, 600-6 that indicate a range of recommended maneuvers for the pilot. The maneuver indicators 600-4, 600-5, 600-6 may also indicate a range of prohibited maneuvers that the pilot should avoid. The example maneuver indicators of FIGS. 6D-6F are complete/partial rings (e.g., circles) around the flight path vector that indicate recommended/prohibited maneuvers (e.g., changes in velocity vector). Although ring maneuver indicators are illustrated in FIGS. 6D-6F, other maneuver indicators may be used to indicate one or more ranges of recommended/prohibited maneuvers.

As described herein, the maneuver indicators 600 may be determined based on one or more intruders that may or may not be currently rendered on the avoidance GUI. Additionally, the maneuver indicators 600 may be determined based on other factors, such as terrain, airspace constraints, and ownship performance. As such, the rendering of maneuver indicators may not necessarily correspond to currently rendered avoidance zones associated with one or more intruders. Instead, in some cases, the maneuver indicators may be representative of intruders and/or other factors. In a specific example, the shaded portion of a ring maneuver indicator (e.g., 600-4, 600-6) may indicate a range of prohibited maneuvers that are based on a current rendered zone in addition to one or more other factors, such as offscreen conflicts.

In FIGS. 6D-6F, the plain portions of the rings (e.g., 600-4, 600-5, 600-6) indicate a recommended range of maneuvers. The shaded portions of the rings (e.g., 600-4, 600-6) indicate prohibited maneuvers. For example, with respect to FIG. 6D, the recommended change in velocity vector is to the right on the display (e.g., away from the rendered zone) 604, whereas the prohibited change in velocity is to the left (e.g., into the rendered zone). FIG. 6E includes a partial ring maneuver indicator 600-5 that indicates a recommended range of maneuvers. In FIG. 6E, the maneuver indicator 600-5 may imply that other maneuvers are prohibited. FIG. 6F illustrates an example maneuver indicator ring 600-6 with two ranges of recommended/prohibited maneuvers.

Note that FIG. 3G illustrates a similar maneuver indicator 301 as FIGS. 6D-6F. In FIG. 3G, the maneuver indicator 301 indicates that the recommended maneuver is to climb. In FIG. 3G, the prohibited maneuver is maintaining a level altitude or descending due to the combination of the conflict zone and terrain.

FIG. 6G illustrates an example avoidance GUI for a realized conflict. In FIG. 6G, the ownship is in a conflict zone (e.g., experiencing a loss of separation). The avoidance GUI includes a maneuver indicator 600-7 that indicates a maneuver direction for exiting the conflict zone. A maneuver indicator for exiting the conflict may be similar to those described with respect to FIGS. 6A-6F. In some implementations, the maneuver indicators for regaining separation may be different than those used to prevent a conflict. For example, a GUI indicator for regaining separation may graphically indicate a greater amount of immediacy using color (e.g., red), blinking, and animation.

The GUI of FIG. 6G includes graphical effects that indicate the realized conflict. For example, the background of the GUI (e.g., entire background) includes an effect that indicates the realized conflict. For example, the background may be shaded/colored to indicate the realized conflict. Additionally, or alternatively, the background may include blinking and/or another animation to indicate the realized conflict. The GUI also includes text (e.g., in the center of the GUI) that instructs the pilot to "Recover Separation." In some implementations, the text may blink to indicate the immediacy of the instruction.

In some implementations, the avoidance system 200 may use additional UI to indicate a recommended/prohibited maneuver. For example, the avoidance system 200 may use audio cues to indicate a recommended/prohibited maneuver. As another example, the avoidance system 200 may use haptic cues to indicate a recommended/prohibited maneuver.

The avoidance system 200 may modify the avoidance GUIs in response to the pilot maneuvering out of the predicted/realized conflicts. For example, maneuvering out of conflict may cause the avoidance GUIs to change back to their original state prior to a conflict. In the case of a predicted conflict, the avoidance GUIs may remove maneuver indicators and any modification of the rendered zones. In the case of a realized conflict, the avoidance GUIs may remove a maneuver indicator, background effect(s), and additional text.

In some implementations, the avoidance system 200 may automatically control the aircraft to perform a resolution maneuver. For example, the avoidance system 200 may determine a resolution maneuver and render it on the display as a suggested automatic resolution maneuver. The avoidance system 200 may then be configured to receive pilot input indicating whether the automatic resolution maneuver should be performed. If the avoidance system 200 receives input indicating that the automatic resolution maneuver should be performed, the autopilot may engage and perform the automatic resolution maneuver. In some implementations, the avoidance system 200 may be configured to provide notice to the pilot that the autopilot will take control. For example, the avoidance GUI may include rendered text and/or numbers that indicate when the automatic resolution maneuver will be performed. In a specific example, the avoidance GUI may include static or blinking text and numbers, such as "Automatic maneuver in 8 seconds", which may count down to the automatic resolution maneuver. The avoidance UI may also include corresponding audio, such as audio that reads the text and count out to the pilot. After performing the automatic resolution maneuver, the autopilot may return to the original course.

In some implementations, the avoidance system 200 may provide a plurality of suggested automatic resolution maneuvers. In these implementations, the pilot may select one of the suggested automatic resolution maneuvers for the autopilot to complete. If the pilot does not select a suggested resolution maneuver (e.g., within a threshold period of time), the autopilot may control the ownship according to one of the suggested automatic resolution maneuvers without additional pilot input. Although the avoidance system 200 may suggest one or more resolution maneuvers, in some implementations, the autopilot may be configured to automatically perform a resolution maneuver in response to detection of a future conflict and/or realized conflict without input from the pilot.

The GUIs of the present disclosure may be described as operating in different states, depending on the type of information displayed by the GUIs. For example, the different states may depend on whether any conflict zones are detected, whether any potential conflicts are predicted, and whether any conflicts are realized. A first state (e.g., a normal state) may describe a GUI in which a conflict zone volume is not identified and there are no realized conflicts. In the first state, the GUI may not include a rendered conflict zone. Other states (e.g., avoidance states) may describe scenarios where conflict volumes are identified and/or conflicts are predicted/realized. In the other states, the GUIs may include avoidance GUI elements. For example, a second state (e.g., a zone rendering state) may describe a GUI in which one or more conflict zone volumes are identified and rendered, but a conflict is not predicted (e.g., see FIGS. 3A-3F). As another example, a third state (e.g., a predicted conflict state) may describe a GUI in which one or more conflicts are predicted (e.g., see FIGS. 4A-4C). As another example, a fourth state (e.g., a realized conflict state) may describe a GUI in which a conflict is realized (e.g., see FIG. 6G).

Components of the ownship 100 and the AOC 108 illustrated herein, such as the systems, modules, and data may represent features included in the ownship 100 and the AOC 108. The systems, modules, and data described herein may be embodied by various aircraft avionics, including electronic hardware, software, firmware, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic hardware and software that provides communication with a variety of different devices. For example, the I/O components may provide communication between other devices and the one or more processing units and memory components.

What is claimed is:

1. An aircraft comprising:

one or more displays;

an avoidance system comprising one or more processing units configured to:

determine a first predicted trajectory of the aircraft;

determine a second predicted trajectory of an additional aircraft;

determine a conflict zone volume based on an intersection between the first predicted trajectory and the second predicted trajectory, wherein the conflict zone volume indicates a predicted volume of airspace in which the aircraft and the additional aircraft experience a loss of separation; and render, on the one or more displays, an avoidance graphical user interface (GUI) from a first person viewpoint with respect to a pilot of the aircraft, wherein the avoidance GUI includes a rendered conflict zone and a rendered flight path GUI element, wherein the rendered conflict zone is based on the conflict zone volume, wherein the rendered conflict zone is a two dimensional representation of the conflict zone volume from the pilot's perspective, and wherein the rendered flight path GUI element indicates a velocity vector of the aircraft; and pilot controls configured to receive pilot input, wherein the avoidance system is configured to move the rendered flight path GUI element in the avoidance GUI in response to the pilot input.

2. The aircraft of claim 1, wherein the avoidance system is configured to render, on the one or more displays, the rendered conflict zone from a side view perspective that indicates the height and depth of the conflict zone volume with respect to the aircraft.

3. The aircraft of claim 1, wherein the avoidance system is configured to render, on the one or more displays, the rendered conflict zone from a third person viewpoint that is outside of the aircraft and the additional aircraft.

4. The aircraft of claim 1, wherein the avoidance system is configured to render, on the one or more displays, the rendered conflict zone from a top down viewpoint that is outside of the aircraft.

5. The aircraft of claim 1, wherein the additional aircraft is a first additional aircraft, and wherein the avoidance system is configured to:

determine a third predicted trajectory of a second additional aircraft; and determine the conflict zone volume based on an intersection between the first predicted trajectory and at least one of the second predicted trajectory and the third predicted trajectory, wherein the conflict zone volume indicates a predicted volume of airspace in which the aircraft and at least one of the first additional aircraft and the second additional aircraft experience a loss of separation.

6. The aircraft of claim 1, wherein the additional aircraft is a first additional aircraft, wherein the conflict zone volume is a first conflict zone volume, wherein the rendered conflict zone is a first rendered conflict zone, and wherein the avoidance system is configured to:

determine a third predicted trajectory of a second additional aircraft;

determine a second conflict zone volume based on an intersection between the first predicted trajectory and the third predicted trajectory; and render a second rendered conflict zone and the first rendered conflict zone on the one or more displays based on the second conflict zone volume and the first conflict zone volume, respectively.

7. The aircraft of claim 1, wherein the avoidance system is configured to:

predict whether there will be a loss of separation between the aircraft and the additional aircraft; and modify the rendering of the rendered conflict zone based on whether there will be a loss of separation between the aircraft and the additional aircraft.

8. The aircraft of claim 7, wherein the avoidance system is configured to generate one or more audio cues that indicate a potential loss of separation in response to predicting a loss of separation between the aircraft and the additional aircraft.

9. The aircraft of claim 7, wherein the avoidance system is configured to generate one or more haptic cues that indicate a potential loss of separation in response to predicting a loss of separation between the aircraft and the additional aircraft.

10. The aircraft of claim 7, wherein the avoidance system is configured to determine a resolution maneuver for the aircraft in response to predicting a loss of separation, and wherein the resolution maneuver is configured to avoid the loss of separation between the aircraft and the additional aircraft.

11. The aircraft of claim 10, wherein the avoidance system is configured to render a maneuver indicator on the one or more displays based on the determined resolution maneuver, and wherein the maneuver indicator graphically indicates the resolution maneuver for the pilot to execute in order to avoid the loss of separation.

12. The aircraft of claim 11, wherein the pilot controls are configured to receive pilot input that controls the aircraft according to the maneuver indicator, wherein the avoidance system is configured to:

determine that the predicted loss of separation is avoided; and remove the rendered conflict zone from the one or more displays in response to the determination that the predicted loss of separation is avoided.

13. The aircraft of claim 1, wherein the avoidance system is configured to:

determine that the aircraft and the additional aircraft are experiencing a loss of separation;

determine a resolution maneuver for the aircraft, wherein the resolution maneuver is configured to regain separation between the aircraft and the additional aircraft; and render a maneuver indicator on the one or more displays based on the resolution maneuver, wherein the maneuver indicator graphically indicates the determined resolution maneuver for the pilot to execute in order to regain separation between the aircraft and the additional aircraft.

14. The aircraft of claim 1, wherein the avoidance system is configured to:

render, in the avoidance GUI, the flight path GUI element as overlapping the rendered conflict zone when the aircraft is flying toward the conflict zone volume; and render the flight path vector GUI element as separate from the rendered conflict zone when the aircraft is not flying toward the conflict zone volume.

15. The aircraft of claim 14, wherein, when the aircraft is flying toward the conflict zone volume, the avoidance system is configured to render a maneuver indicator that indicates a recommended direction for the pilot to adjust the rendered flight path GUI element using the pilot controls in order to avoid the conflict zone volume.

16. The aircraft of claim 15, wherein the maneuver indicator indicates a range of recommended directions and a range of prohibited directions for the pilot to adjust the rendered flight path GUI element.

17. The aircraft of claim 14, wherein the avoidance system is configured to:

render the flight path GUI element as a first graphical representation that indicates the aircraft is flying toward the conflict zone volume when the flight path GUI element is overlapping the rendered conflict zone; and render the flight path GUI element as a second graphical representation that indicates the aircraft is not flying toward the conflict zone volume when the flight path GUI element is not overlapping the rendered conflict zone.

18. The aircraft of claim 14, wherein the avoidance system is configured to:

render the rendered conflict zone as a first graphical representation that indicates the aircraft is flying toward the conflict zone volume when the flight path GUI element is overlapping the rendered conflict zone; and render the rendered conflict zone as a second graphical representation that indicates the aircraft is not flying toward the conflict zone volume when the flight path GUI element is not overlapping the rendered conflict zone.

19. The aircraft of claim 1, wherein the avoidance GUI includes a nose direction GUI element that indicates a direction in which a nose of the aircraft is currently pointing.

20. A non-transitory computer-readable medium comprising computer-executable instructions configured to cause one or more processing units to:

determine a first predicted trajectory of a first aircraft;

determine a second predicted trajectory of a second aircraft;

determine a conflict zone volume based on an intersection between the first predicted trajectory and the second predicted trajectory, wherein the conflict zone volume indicates a predicted volume of airspace in which the first aircraft and the second aircraft experience a loss of separation;

render, on one or more displays, an avoidance graphical user interface (GUI) from a first person viewpoint with respect to a pilot of the first aircraft, wherein the avoidance GUI includes a rendered conflict zone and a rendered flight path GUI element, wherein the rendered conflict zone that is based on the conflict zone volume, and wherein the rendered conflict zone is a two dimensional representation of the conflict zone volume from the pilot's perspective, and wherein the rendered flight path GUI element indicates a velocity vector of the aircraft; and move the rendered flight path GUI element in the avoidance GUI in response to pilot input on pilot controls.

21. The computer-readable medium of claim 20, further comprising instructions that cause the one or more processing units to render, on the one or more displays, the rendered conflict zone from a side view perspective that indicates the height and depth of the conflict zone with respect to the first aircraft.

22. The computer-readable medium of claim 20, further comprising instructions that cause the one or more processing units to render, on the one or more displays, the rendered conflict zone from a third person viewpoint that is outside of the first aircraft and the second aircraft.

23. The computer-readable medium of claim 20, further comprising instructions that cause the one or more processing units to render, on the one or more displays, the rendered conflict zone from a top down viewpoint that is outside of the first aircraft.

24. The computer-readable medium of claim 20, further comprising instructions that cause the one or more processing units to:

determine a third predicted trajectory of a third aircraft; and determine the conflict zone volume based on an intersection between the first predicted trajectory and at least one of the second predicted trajectory and the third predicted trajectory, wherein the conflict zone volume indicates a predicted volume of airspace in which the first aircraft and at least one of the second aircraft and the third aircraft experience a loss of separation.

25. The computer-readable medium of claim 20, wherein the conflict zone volume is a first conflict zone volume, wherein the rendered conflict zone is a first rendered conflict zone, and wherein the computer-readable medium further comprises instructions that cause the one or more processing units to:

determine a third predicted trajectory of a third aircraft;

determine a second conflict zone volume based on an intersection between the first predicted trajectory and the third predicted trajectory; and render a second rendered conflict zone and the first rendered conflict zone on the one or more displays based on the second conflict zone volume and the first conflict zone volume, respectively.

26. The computer-readable medium of claim 20, further comprising instructions that cause the one or more processing units to:

predict whether there will be a loss of separation between the first aircraft and the second aircraft; and modify the rendering of the rendered conflict zone based on whether there will be a loss of separation between the first aircraft and the second aircraft.

27. The computer-readable medium of claim 26, further comprising instructions configured to generate one or more audio cues that indicate a potential loss of separation in response to predicting a loss of separation between the first aircraft and the second aircraft.

28. The computer-readable medium of claim 26, further comprising instructions configured to generate one or more haptic cues that indicate a potential loss of separation in response to predicting a loss of separation between the first aircraft and the second aircraft.

29. The computer-readable medium of claim 26, further comprising instructions that cause the one or more processing units to determine a resolution maneuver for the first aircraft in response to predicting a loss of separation, wherein the resolution maneuver is configured to avoid the loss of separation between the first aircraft and the second aircraft.

30. The computer-readable medium of claim 29, further comprising instructions that cause the one or more processing units to render a maneuver indicator on the one or more displays based on the determined resolution maneuver, wherein the maneuver indicator graphically indicates the resolution maneuver for the pilot to execute using the pilot controls in order to avoid the loss of separation.

31. The computer-readable medium of claim 30, further comprising instructions that cause the one or more processing units to:

determine that the predicted loss of separation is avoided; and remove the rendered conflict zone from the one or more displays in response to the determination that the predicted loss of separation is avoided.

32. The computer-readable medium of claim 20, further comprising instructions that cause the one or more processing units to:

determine that the first aircraft and the second aircraft are experiencing a loss of separation;

determine a resolution maneuver for the first aircraft, wherein the resolution maneuver is configured to regain separation between the first aircraft and the second aircraft; and render a maneuver indicator on the one or more displays based on the resolution maneuver, wherein the maneuver indicator graphically indicates the determined resolution maneuver for the pilot to execute in order to regain separation between the first aircraft and the second aircraft.

33. The computer-readable medium of claim 20, further comprising instructions that cause the one or more processing units to:

render, in the avoidance GUI, the flight path GUI element as overlapping the rendered conflict zone when the first aircraft is flying toward the conflict zone volume; and render the flight path GUI element as separate from the rendered conflict zone when the first aircraft is not flying toward the conflict zone volume.

34. The computer-readable medium of claim 33, wherein, when the first aircraft is flying toward the conflict zone volume, the instructions are configured to cause the one or more processing units to render a maneuver indicator that indicates a recommended direction for the pilot to adjust the rendered flight path GUI element using the pilot controls in order to avoid the conflict zone volume.

35. The computer-readable medium of claim 34, wherein the maneuver indicator indicates a range of recommended directions and a range of prohibited directions for the pilot to adjust the rendered flight path GUI element.

36. The computer-readable medium of claim 33, further comprising instructions that cause the one or more processing units to:

render the flight path GUI element as a first graphical representation that indicates the first aircraft is flying toward the conflict zone volume when the flight path GUI element is overlapping the rendered conflict zone; and render the flight path GUI element as a second graphical representation that indicates the first aircraft is not flying toward the conflict zone volume when the flight path GUI element is not overlapping the rendered conflict zone.

37. The computer-readable medium of claim 33, further comprising instructions that cause the one or more processing units to:

render the rendered conflict zone as a first graphical representation that indicates the first aircraft is flying toward the conflict zone volume when the flight path GUI element is overlapping the rendered conflict zone; and render the rendered conflict zone as a second graphical representation that indicates the first aircraft is not flying toward the conflict zone volume when the flight path GUI element is not overlapping the rendered conflict zone.

38. The computer-readable medium of claim 20, wherein the avoidance GUI includes a nose direction GUI element that indicates a direction in which a nose of the first aircraft is currently pointing.

* * * * *